(12) United States Patent
Yamamoto

(10) Patent No.: US 8,233,082 B2
(45) Date of Patent: Jul. 31, 2012

(54) CAMERA CASING INCLUDING ACCESSORY SHOE FOR ALLOWING THE ATTACHMENT OF VARIOUS/PLURAL EXTERNAL DEVICES

(75) Inventor: Shuusaku Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 295 days.

(21) Appl. No.: 12/504,141

(22) Filed: Jul. 16, 2009

(65) Prior Publication Data

US 2010/0013986 A1  Jan. 21, 2010

(30) Foreign Application Priority Data

Jul. 18, 2008 (JP) ................................. 2008-187805

(51) Int. Cl.
  *H04N 5/225* (2006.01)
  *G03D 13/04* (2006.01)
  *G03B 17/00* (2006.01)
(52) U.S. Cl. ........ 348/375; 348/374; 348/373; 396/638; 396/544; 396/422; 396/419; D16/136
(58) Field of Classification Search .......... 348/373–376; 396/419, 422, 544, 638, 592; D16/136, 200–230, D16/237–250
See application file for complete search history.

(56) References Cited

U.S. PATENT DOCUMENTS

| | | | |
|---|---|---|---|
| 4,666,274 A | | 5/1987 | Maeno et al. |
| 6,137,963 A | * | 10/2000 | Morisawa et al. ............ 396/429 |
| 6,138,826 A | * | 10/2000 | Kanamori et al. ......... 206/316.2 |
| 6,314,247 B1 | * | 11/2001 | Mogamiya et al. ........... 396/384 |
| 7,362,371 B1 | * | 4/2008 | Tanaka et al. ................. 348/373 |
| 7,423,690 B2 | * | 9/2008 | Lee et al. ....................... 348/374 |
| 7,525,596 B2 | * | 4/2009 | Yamaguchi ................... 348/375 |
| 2005/0012852 A1 | * | 1/2005 | Gann et al. .................... 348/373 |

FOREIGN PATENT DOCUMENTS

| | | |
|---|---|---|
| JP | 59-101247 U | 7/1984 |
| JP | 61-066327 U | 5/1986 |
| JP | 8-220607 A | 8/1996 |
| JP | 2000-330171 A | 11/2000 |
| JP | 2007-140012 | 6/2007 |
| JP | 2008-112019 A | 5/2008 |
| JP | 2008-191229 A | 8/2008 |

* cited by examiner

*Primary Examiner* — Lin Ye
*Assistant Examiner* — Marly Camargo
(74) *Attorney, Agent, or Firm* — Hamre, Schumann, Mueller & Larson, P.C.

(57) ABSTRACT

The image pickup apparatus of the present invention includes a front plate 12 fitted to an outer cylindrical surface of a lens barrel 5b and a rear plate 13 placed on the backside of a liquid crystal panel 7, and an accessory shoe 11 is fixed to a rib 12a formed on the top of the front plate 12 and a rib 13a formed on the top of the rear plate 13. Consequently, it is possible to enhance the strength of attachment of the accessory shoe 11. Therefore, even when an external device with a large weight such as a strobe device 51 is attached to the accessory shoe 11, it is possible to avoid deformation or damage to the accessory shoe 11.

10 Claims, 23 Drawing Sheets

CAMERA CASING INCLUDING ACCESSORY SHOE FOR ALLOWING THE ATTACHMENT OF VARIOUS/PLURAL EXTERNAL DEVICES

BACKGROUND OF INVENTION

1. Field of the Invention

The present invention relates to image pickup apparatuses including an accessory shoe to/from which a variety of external devices such as a strobe device can be attached/detached.

2. Description of Related Art

In recent years, digital cameras have been equipped with an accessory shoe to/from which a variety of external devices such as a strobe device and a microphone can be attached/detached. JP 61-066327 U, JP 2000-330171 A, and JP 2008-112019 A disclose configurations of accessory shoes.

In each of the conventional configurations, however, the accessory shoe is fixed to the top of a casing of an image pickup apparatus with screws. Thus, the strength of the attachment is inadequate. Therefore, when an external device with a large weight such as a strobe device is attached to the accessory shoe, the accessory shoe may become deformed or damaged.

SUMMARY OF THE INVENTION

With the foregoing in mind, it is an object of the present invention to provide an image pickup apparatus capable of avoiding deformation or damage to an accessory shoe even when an external device with a large weight such as a strobe device is attached to the accessory shoe.

The image pickup apparatus of the present invention is an image pickup apparatus that includes: a casing; and an accessory shoe placed on a top surface of the casing and to which a variety of external devices can be attached. The image pickup apparatus further includes a first support member fixed to a first side surface adjacent to the top surface of the casing, and a second support member fixed to a second side surface facing the first side surface. The first support member and the second support member each includes a fixing portion for fixing the accessory shoe.

According to the present invention, it is possible to avoid deformation or damage to an accessory shoe even when an external device with a large weight such as a strobe device is attached to the accessory shoe.

DETAILED DESCRIPTION OF THE INVENTION

Figure 1A:
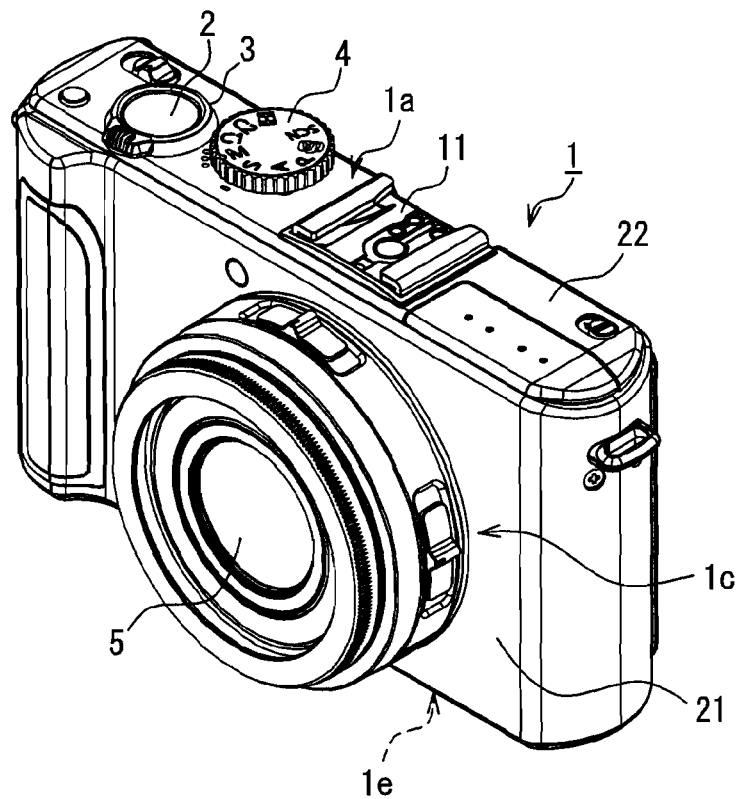
FIG. 1A is a perspective view showing the appearance of an image pickup apparatus according to one embodiment.

The image pickup apparatus of the present invention is an image pickup apparatus that includes: a casing; and an accessory shoe which is placed on a top surface of the casing and to which a variety of external devices can be attached. The image pickup apparatus further includes a first support member fixed to a first side surface adjacent to the top surface of the casing, and a second support member fixed to a second side surface facing the first side surface. The first support member and the second support member each includes a fixing portion for fixing the accessory shoe.

The image pickup apparatus of the present invention, having the basic structure as described above, can be configured as follows.

That is, the image pickup apparatus of the present invention further may include a barrel including a lens that is placed on the first side surface, and the first support member may be fitted to an outer cylindrical surface of the barrel. By configuring the image pickup apparatus of the present invention in this way, it is possible to enhance not only the strength of attachment of the accessory shoe but also that of the barrel.

The image pickup apparatus of the present invention further may include a display panel capable of displaying images that is placed on the second side surface, and the second support member may be placed on a backside of a display surface of the display panel. By configuring the image pickup apparatus of the present invention in this way, it is possible not only to enhance the strength of attachment of the accessory shoe but also to avoid the occurrence of a crack in the display panel when pressure is applied to the display surface.

In the image pickup apparatus of the present invention, the fixing portions may include a first fixing portion provided on the first support member and a second fixing portion provided on the second support member, and the first fixing portion and the second fixing portion may be aligned in a surface direction of the top surface of the casing. By configuring the image pickup apparatus of the present invention in this way, it is possible to reduce the size of the casing in the height direction (the direction orthogonal to the top surface of the casing), thereby enabling the size of the image pickup apparatus to be reduced.

The image pickup apparatus of the present invention further may include a tripod fixing part to which a tripod can be fixed, and the tripod fixing part may be fixed to the first support member and the second support member. By configuring the image pickup apparatus of the present invention in this way, it is possible to enhance the strength of attachment of the tripod fixing part. Therefore, even if a load is applied to the tripod fixing part due to vibrations or the like being applied to the image pickup apparatus or the like when the image pickup apparatus is fixed to a tripod, it is possible to avoid deformation or damage to the tripod fixing part. In particular this configuration is effective in avoiding deformation or damage to the tripod fixing part when the image pickup apparatus is fixed to a tripod when a device with a large weight such as a strobe device is attached to the accessory shoe.

Embodiment

[1. Configuration of Image Pickup Apparatus]

Figure 1B:
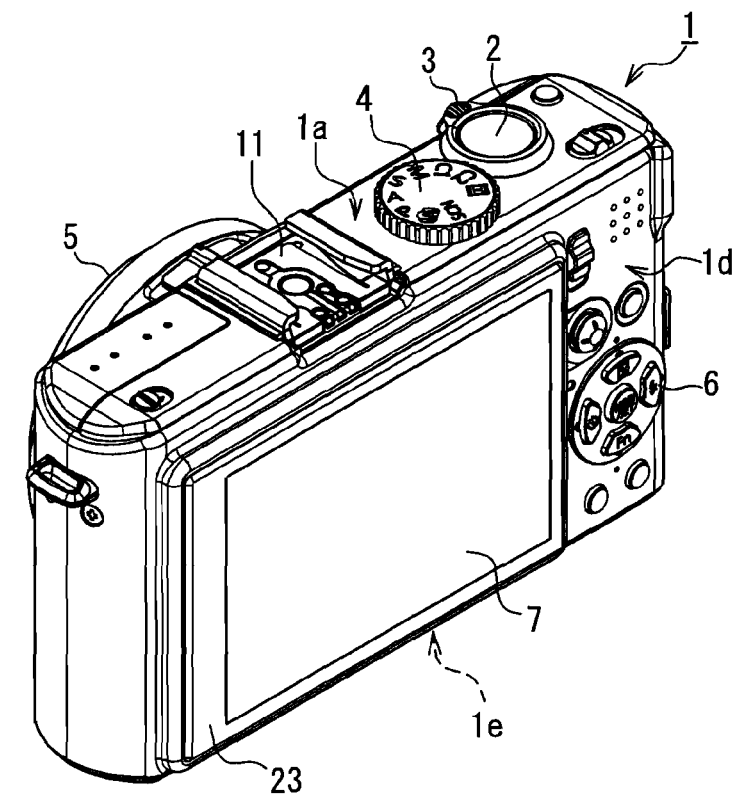
FIG. 1B is a perspective view showing the appearance of the image pickup apparatus according to one embodiment.
Figure 1C:
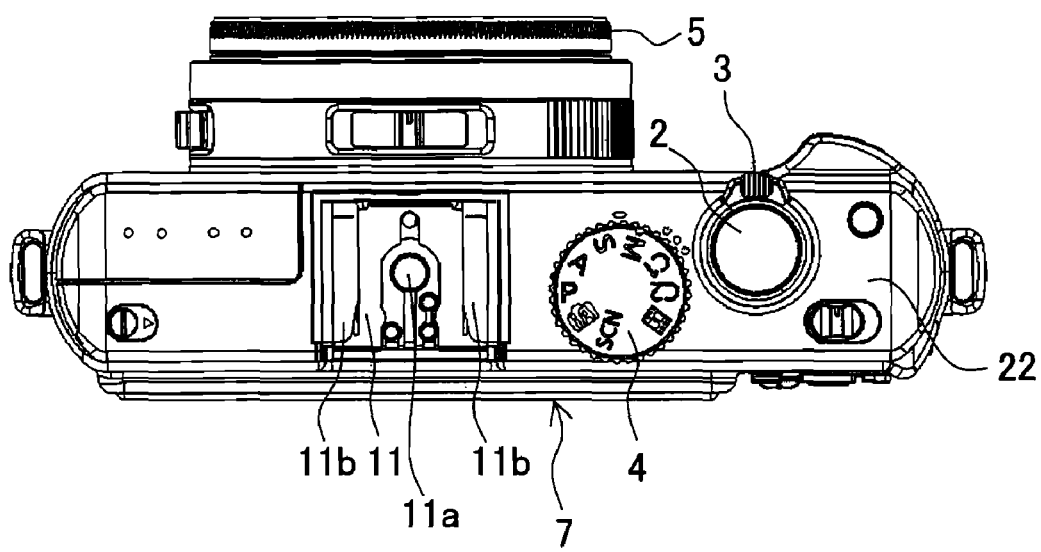
FIG. 1C is a top view showing the appearance of the image pickup apparatus according to one embodiment.
Figure 1D:
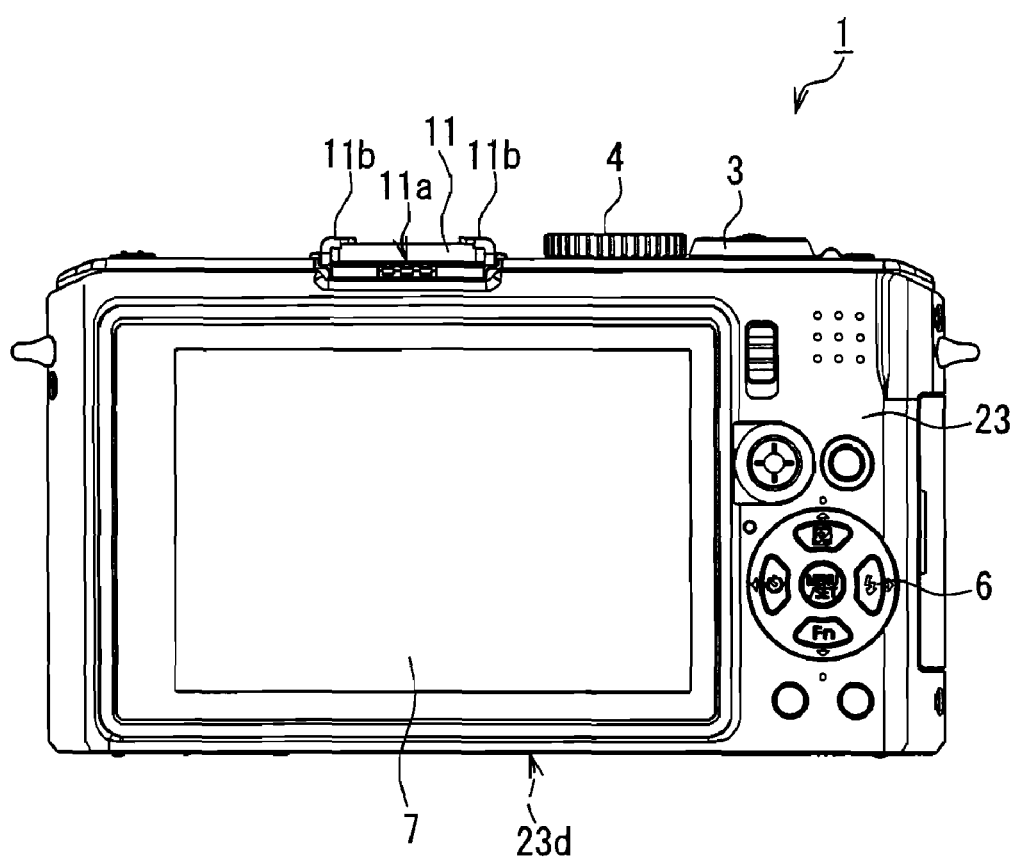
FIG. 1D is a back view showing the appearance of the image pickup apparatus according to one embodiment.

FIGS. 1A and 1B are perspective views of a digital camera as an example of the image pickup apparatus according to the present embodiment. FIG. 1C is a top view of the digital camera. FIG. 1D is a back view of the digital camera.

As shown in FIGS. 1A to 1D, the digital camera 1 is enclosed primarily with a front panel 21, a top panel 22, and a back panel 23. A front surface 1c of the digital camera 1 is provided with an image pickup portion 5 capable of capturing external light into the digital camera 1. The image pickup portion 5 includes primarily a lens and a lens barrel 5b, and it can introduce light to an image pickup device placed inside the digital camera 1. In the present embodiment, a surface of the digital camera 1 that faces upward when the digital camera 1 is in an upright position as shown in FIG. 1A or 1B is defined as a top surface 1a, a surface that faces downward is defined as an undersurface 1e, and surfaces adjacent to the top surface 1a and the undersurface 1e are respectively defined as the front surface 1c and a back surface 1b. The front surface 1c and the back surface 1d face opposite directions from each other.

As shown in FIG. 1C, the top surface 1a (the top panel 22) of the digital camera 1 is provided with a release button 2, a zoom lever 3, and a mode dial 4. By operating the release button 2, an image picked up by the image pickup device can be captured. The zoom lever 3 can be operated rotatably. The digital camera 1 carries out control for moving a zoom lens included in the image pickup portion 5 in the optical axis direction when the zoom lever 3 is rotated. By moving the zoom lens in the optical axis direction, an optical image formed on an image pickup surface of the image pickup device can be zoomed in or out. The mode dial 4 can be rotated. In the digital camera 1, a variety of operation modes such as a normal shooting mode, a close shooting mode, and a personal computer connection mode can be selected by rotating the mode dial 4. An accessory shoe 11 is placed on the top surface 1a of the digital camera 1.

A variety of external devices such as an external strobe device and a microphone can be attached to and detached from the accessory shoe 11. As shown in FIG. 1C, the accessory shoe 11 includes a contact portion 11a and a holding portion 11b. At least part of the contact portion 11a exposed externally is made of a conductive material such as metal. An external device can be mechanically attached using the holding portion 11b. The backside of the externally-exposed surface of the contact portion 11a is connected electrically to an electric circuit board placed in the digital camera 1. Therefore, by attaching an external device to the holding portion 11b and bring the contact portion 11a into contact with an electric contact of the external device, the external device and the digital camera 1 can be connected to each other electrically. It should be noted that external devices that can be attached to the accessory shoe 11 are not limited to those that can be connected to the contact portion 11a electrically, and they may be external devices that are to be attached to the holding portion 11b only mechanically.

As shown in FIG. 1D, the digital camera 1 includes an operation portion 6, a liquid crystal display panel 7, and the like on the back surface 1d. The liquid crystal display panel 7 can display, for example, images generated on the basis of optical images that enter through the image pickup portion 5 (through-the-lens images) and images reproduced from a recording medium, such as a memory card, attached to the digital camera 1.

Figure 2A:
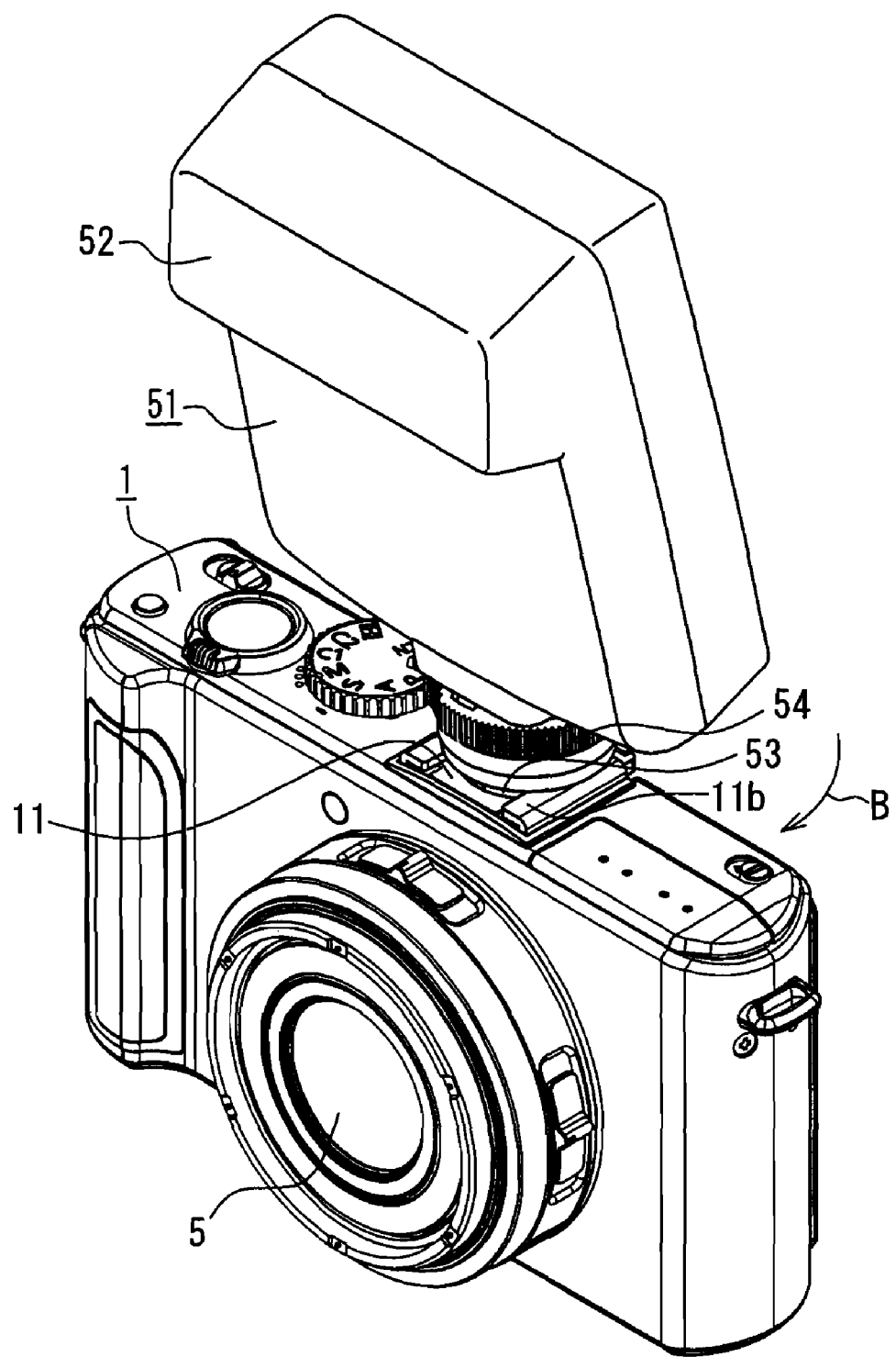
FIG. 2A is a perspective view showing a state where a strobe device is attached to the image pickup apparatus according to one embodiment.
Figure 2B:
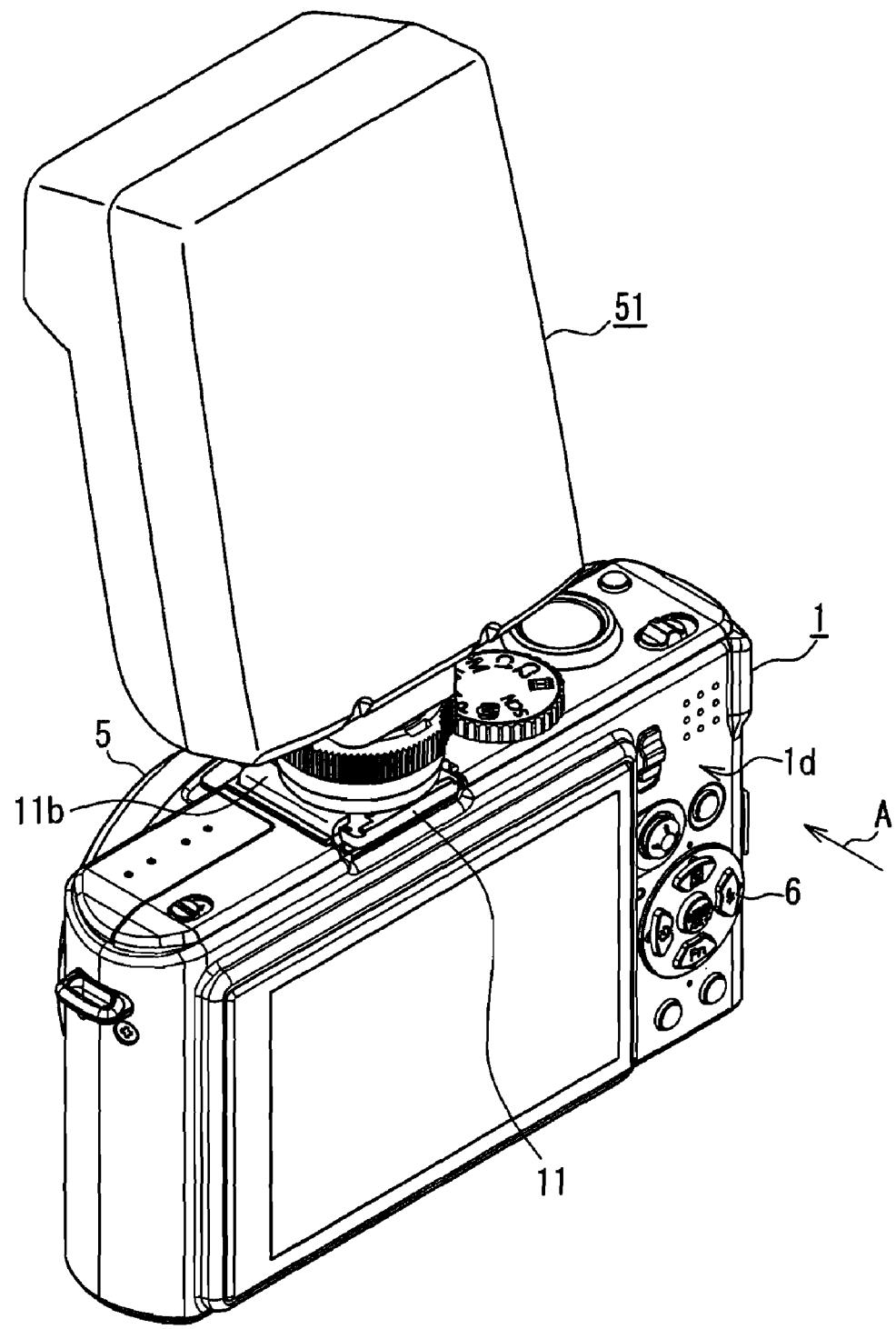
FIG. 2B is a perspective view showing the state where the strobe device is attached to the image pickup apparatus according to one embodiment.
Figure 2C:
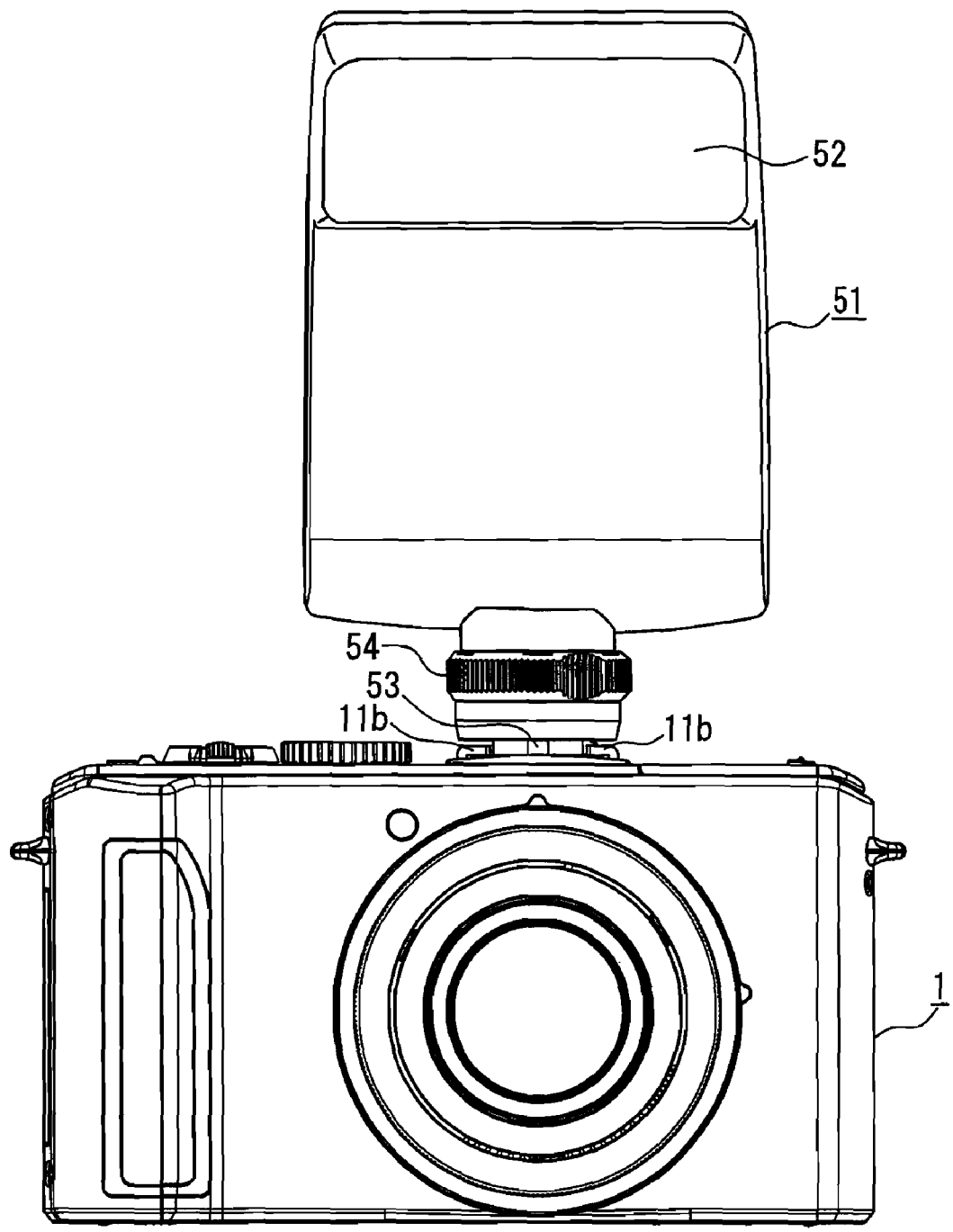
FIG. 2C is a front view showing the state where the strobe device is attached to the image pickup apparatus according to one embodiment.
Figure 2D:
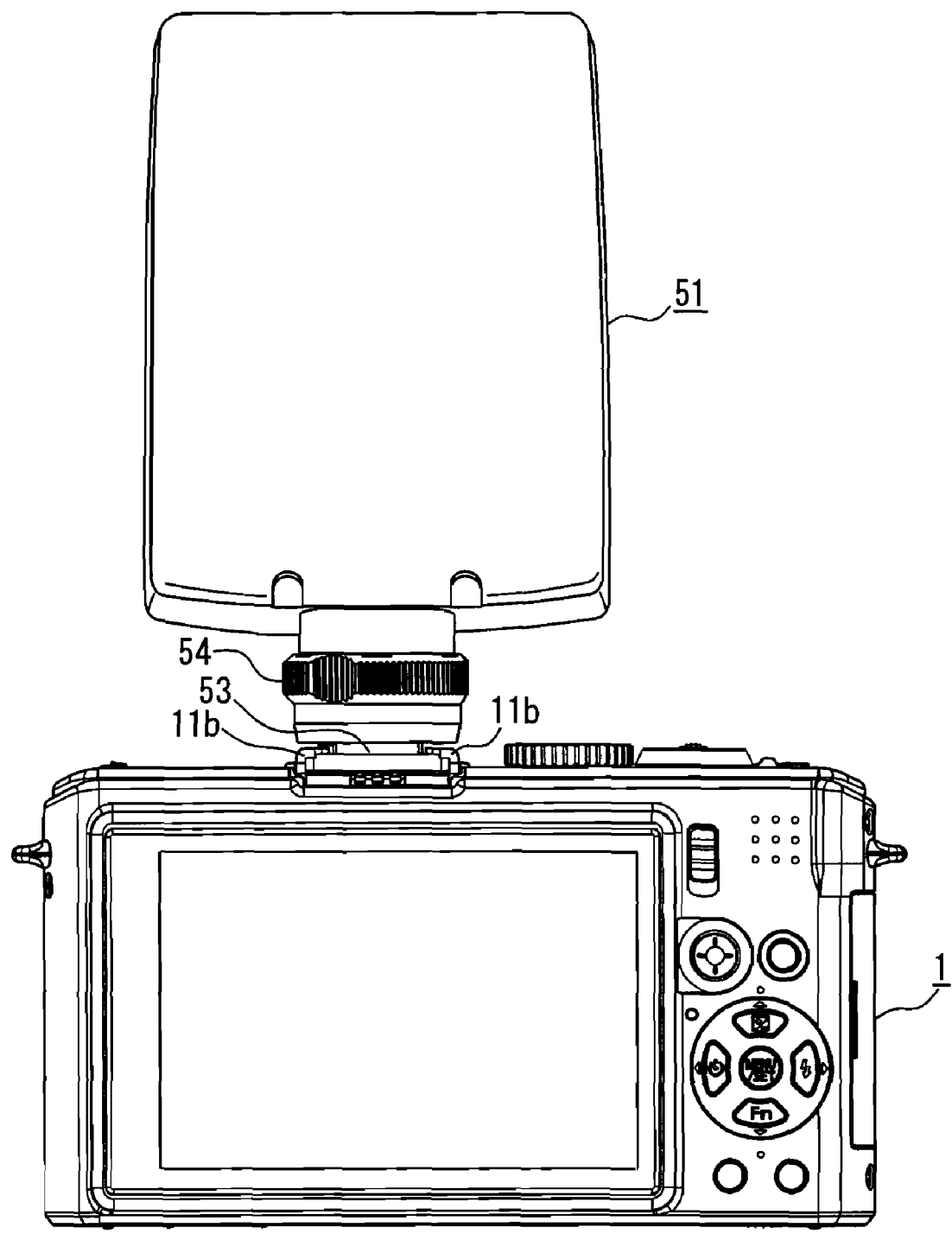
FIG. 2D is a back view showing the state where the strobe device is attached to the image pickup apparatus according to one embodiment.

FIGS. 2A to 2D show a state where a strobe device 51 is attached to the accessory shoe 11 of the digital camera 1 according to the present embodiment. FIG. 2A is a perspective view of the digital camera 1 from the front side. FIG. 2B is a perspective view of the digital camera 1 from the back side. FIG. 2C is a side view of the digital camera 1 from the front side. FIG. 2D is a side view of the digital camera 1 from the backside. It should be noted that the strobe device 51 is an example of the external devices that can be attached to and detached from the accessory shoe 11.

When attaching the strobe device 51 to the accessory shoe 11, a light emitting portion 52 of the strobe device 51 is brought to face the same direction as the front surface 1c of the digital camera 1 faces, and a connection portion 53 placed on the lower end of the strobe device 51 is attached to the holding portion 11b of the accessory shoe 11. At the time of attachment, the connection portion 53 is inserted to the holding portion 11b in the direction indicated by the arrow A (see FIG. 2B). When the connection portion 53 is attached to the holding portion 11b, an electric contact (not shown) placed on the undersurface of the connection portion 53 faces the contact portion 11a (see FIG. 1C, etc.) of the accessory shoe 11. Next, by rotating a dial 54, which is placed rotatably above the connection portion 53, in the direction indicated by the arrow B (see FIG. 2A), the holding portion 11b is clamped by the connection portion 53 and the strobe device 51 is fixed to the accessory shoe 11. At this time, the electric contact (not shown) placed on the undersurface of the connection portion 53 and the contact portion 11a (see FIG. 1C, etc.) of the accessory shoe 11 are connected to each other electrically. In the present embodiment, the electric contact (not shown) placed on the undersurface of the connection portion 53 faces the contact portion 11a of the accessory shoe 11 when the connection portion 53 is attached to the holding portion 11b. However, the electric contact and the connection portion 53 may come into contact with each other.

A variety of lens units such as a conversion lens can be attached to and detached from the image pickup portion 5 of the digital camera 1 according to the present embodiment.

Figure 3A:
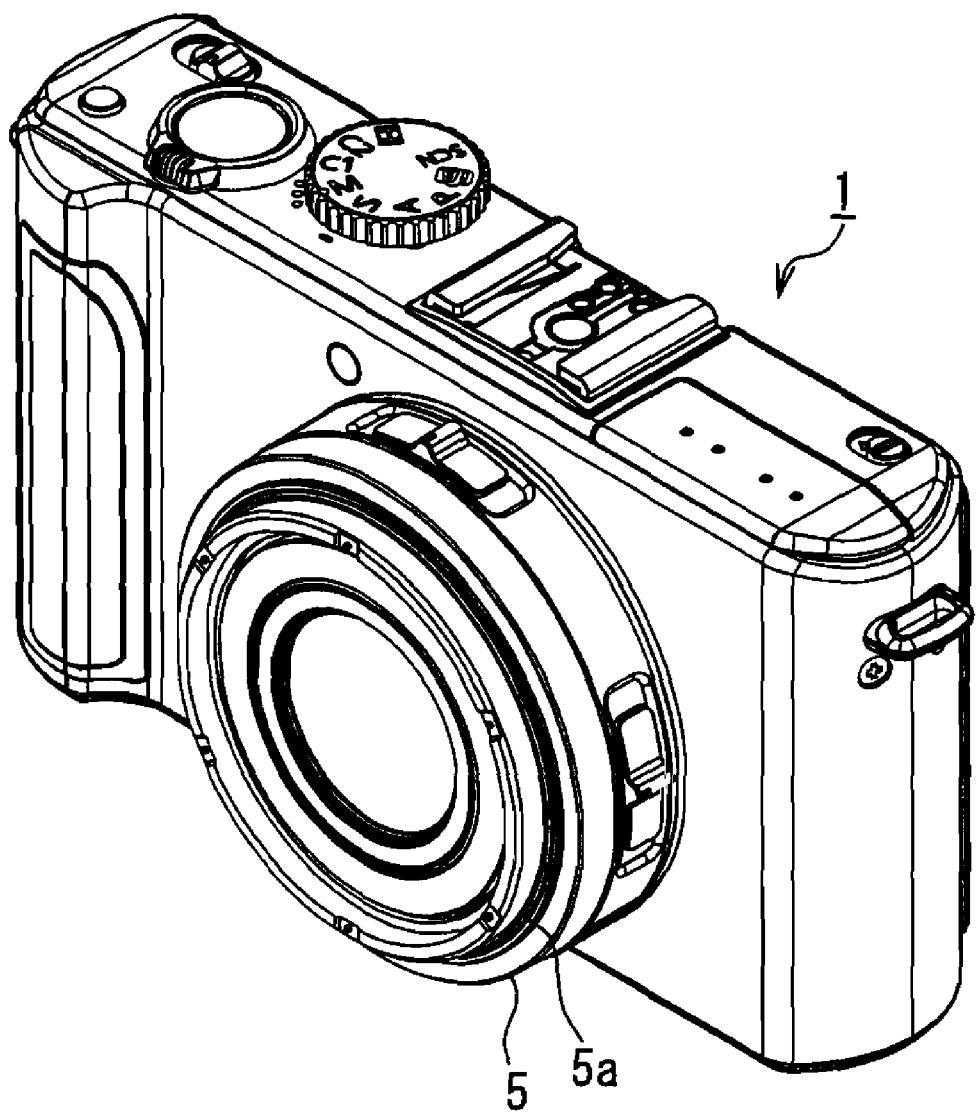
FIG. 3A is a perspective view showing the appearance of the image pickup apparatus according to one embodiment.

FIG. 3A shows the digital camera before a conversion lens is attached thereto. When a conversion lens is not attached to the digital camera 1, a lens ring (not shown) is screwed into a screw portion 5a formed on the front end of the image pickup portion 5. In the state shown in FIG. 3A, the lens ring is removed from the image pickup portion 5 and the screw portion 5a is being exposed.

Figure 3B:
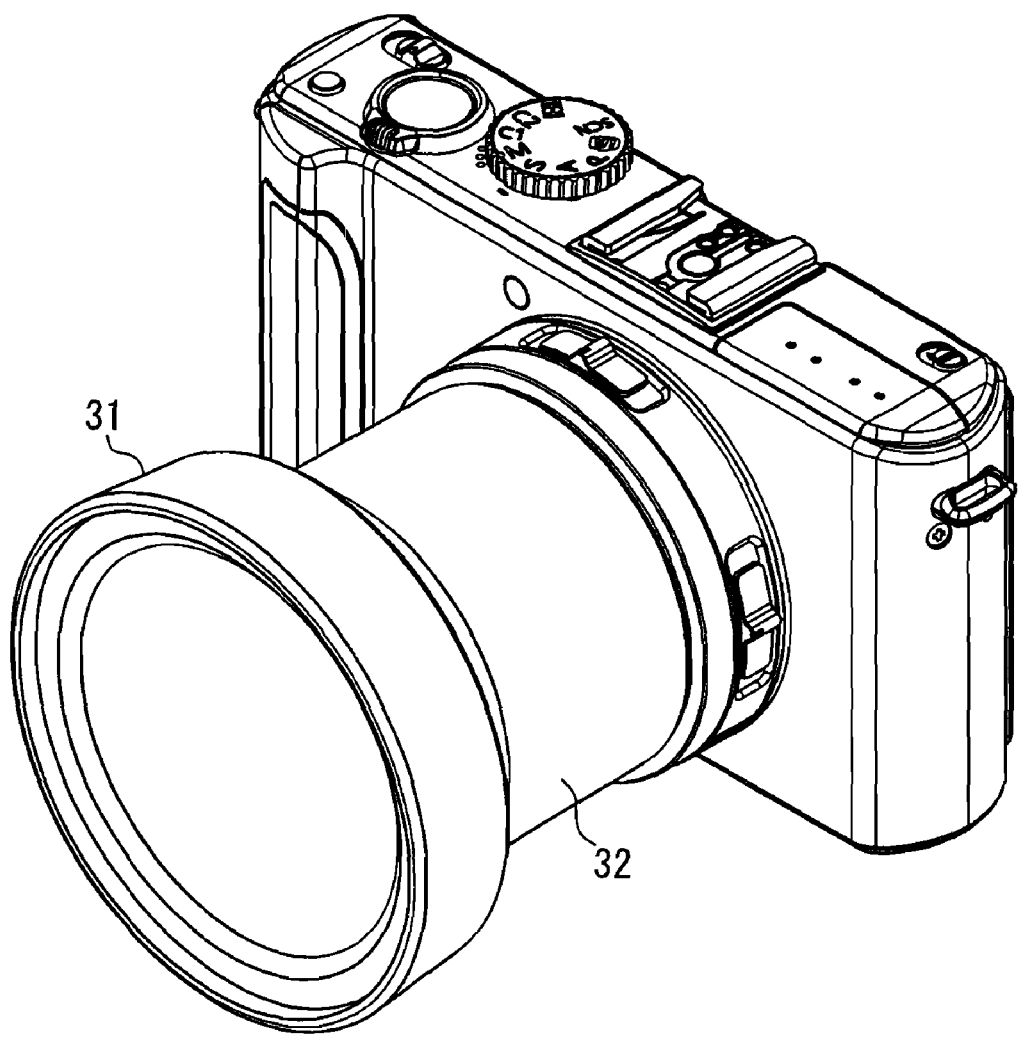
FIG. 3B is a perspective view of the image pickup apparatus equipped with a conversion lens.

FIG. 3B shows a state where a conversion lens 31 is attached to the front end of the image pickup portion 5. The conversion lens 31 can be attached to the image pickup portion 5 through a lens adaptor 32. The lens adaptor 32 is in a substantially cylindrical shape. A screw portion that can be screwed into the screw portion 5a is formed on one end of the lens adaptor 32 and a screw portion that can be screwed into a screw portion formed on the conversion lens 31 is formed on the other end.

[2. Internal Structure of Image Pickup Apparatus]

Figure 4A:
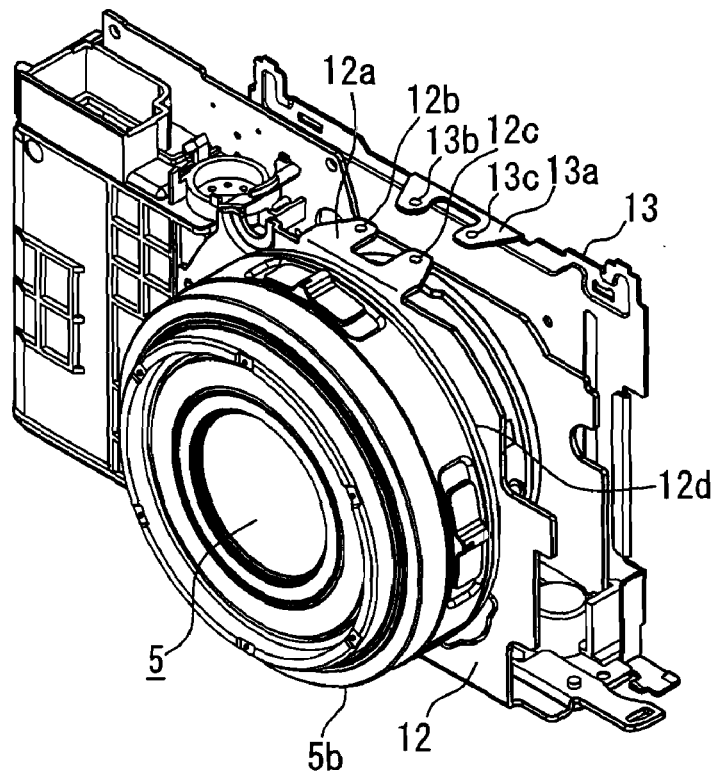
FIG. 4A is a perspective view showing the internal structure of the image pickup apparatus according to one embodiment.
Figure 4B:
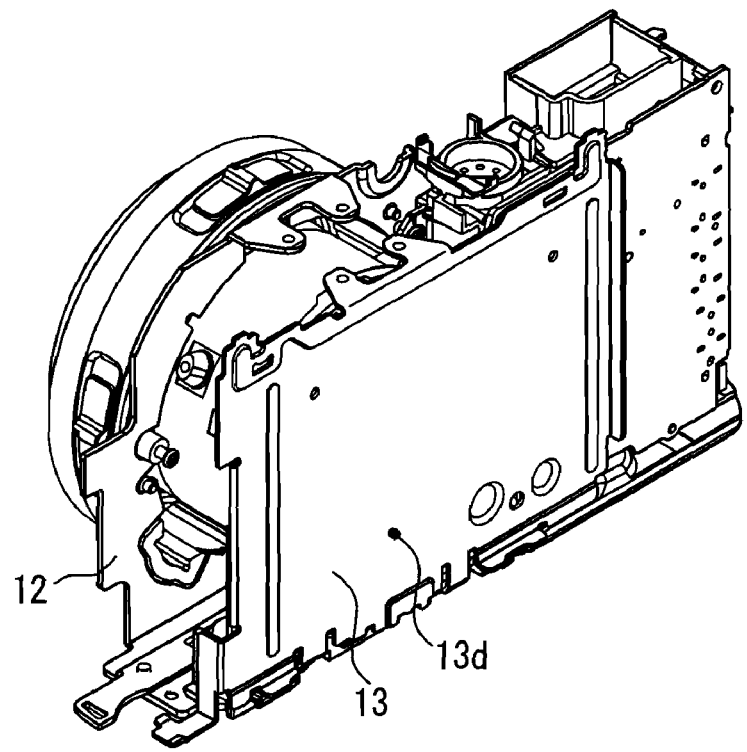
FIG. 4B is a perspective view showing the internal structure of the image pickup apparatus according to one embodiment.

FIGS. 4A and 4B show the internal structure of the digital camera 1 according to the present embodiment. FIGS. 4A and 4B show a state where the front panel 21, the top panel 22, the back panel 23, and the like are removed from the digital camera 1 shown in FIGS. 1A and 1B. In the present embodiment, the front plate 12 is placed on the outer periphery of the lens barrel 5b of the image pickup portion 5, as shown in FIG. 4A. The rear plate 13 is placed on the back surface 1d side of the digital camera 1, as shown in FIG. 4B.

Figure 5:
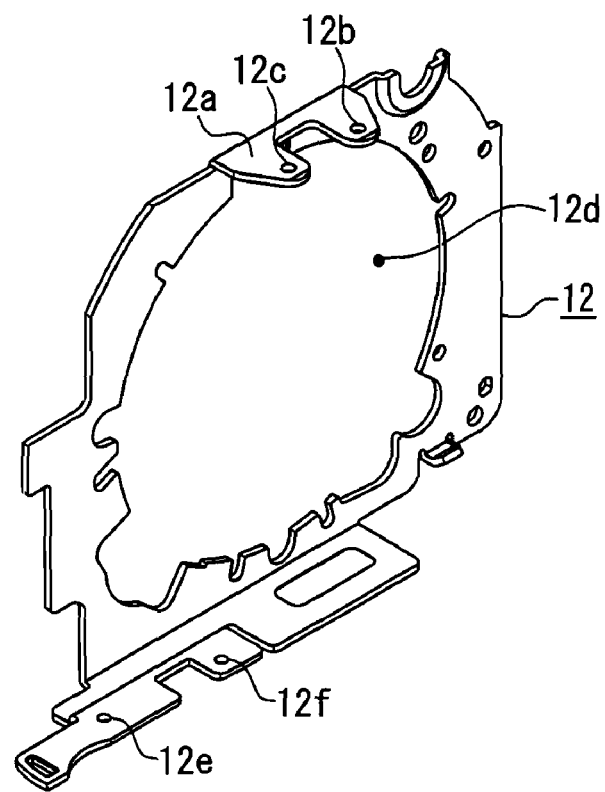
FIG. 5 is a perspective view of a front plate.

FIG. 5 is a perspective view of the front plate 12. Although the front plate 12 is formed by processing a flat-shaped metal plate such as a metal sheet, it also can be formed by resin molding. An opening portion 12d into which the lens barrel 5b can be inserted is formed at the substantially center of the front plate 12. A rib 12a sticking out in the direction orthogonal to the main plane of the front plate 12 is formed on the top portion of the front plate 12. Hole portions 12b and 12c into which screws (will be described later) can be screwed are formed in the rib 12a. Screw holes 12e and 12f into which screws can be screwed are formed in the bottom portion of the front plate 12. It should be noted that the rib 12a is formed such that it is positioned under the accessory shoe 11 when the front plate 12 is incorporated into the digital camera 1.

Figure 6:
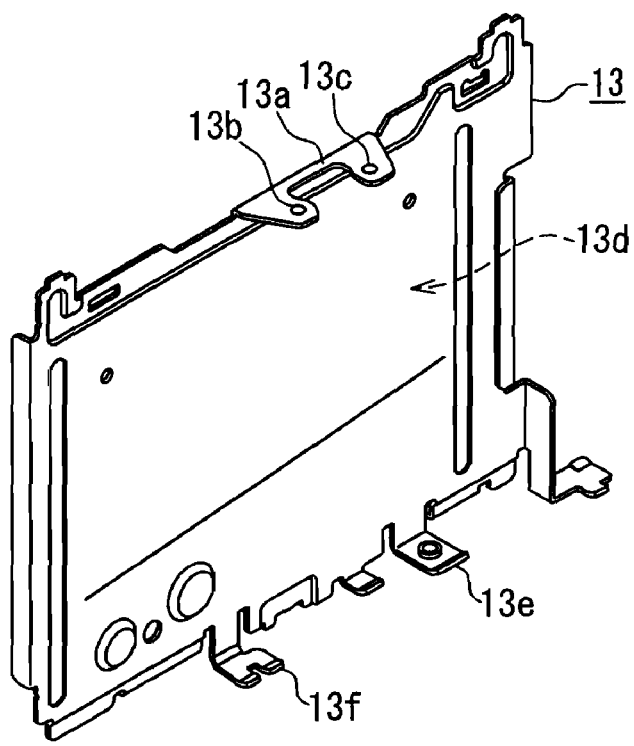
FIG. 6 is a perspective view of a rear plate.

FIG. 6 is a perspective view of the rear plate 13. Although the rear plate 13 is formed by processing a flat-shaped metal plate such as a metal sheet, it also can be formed by resin molding. A plane portion 13d is provided at the substantially center of the rear plate 13. The plane portion 13b is positioned on the backside of the display surface of the liquid crystal display panel 7 when the rear plate 13 is incorporated into the digital camera 1. A rib 13a sticking out in the direction orthogonal to the surface of the plane portion 13d is formed on the top portion of the rear plate 13. Hole portions 13b and 13c into which screws (will be described later) can be screwed are formed in the rib 13a. The bottom portion of the rear plate 13 is provided with fixing portions 13e and 13f. A hole portion into which a screw can be inserted is formed in the fixing portion 13e. The fixing portion 13f has a recess into which a protrusion 23e formed on the back panel 23 is fitted.

Hereinafter, a method of assembling the digital camera 1 according to the present invention will be described.

Figure 7A:
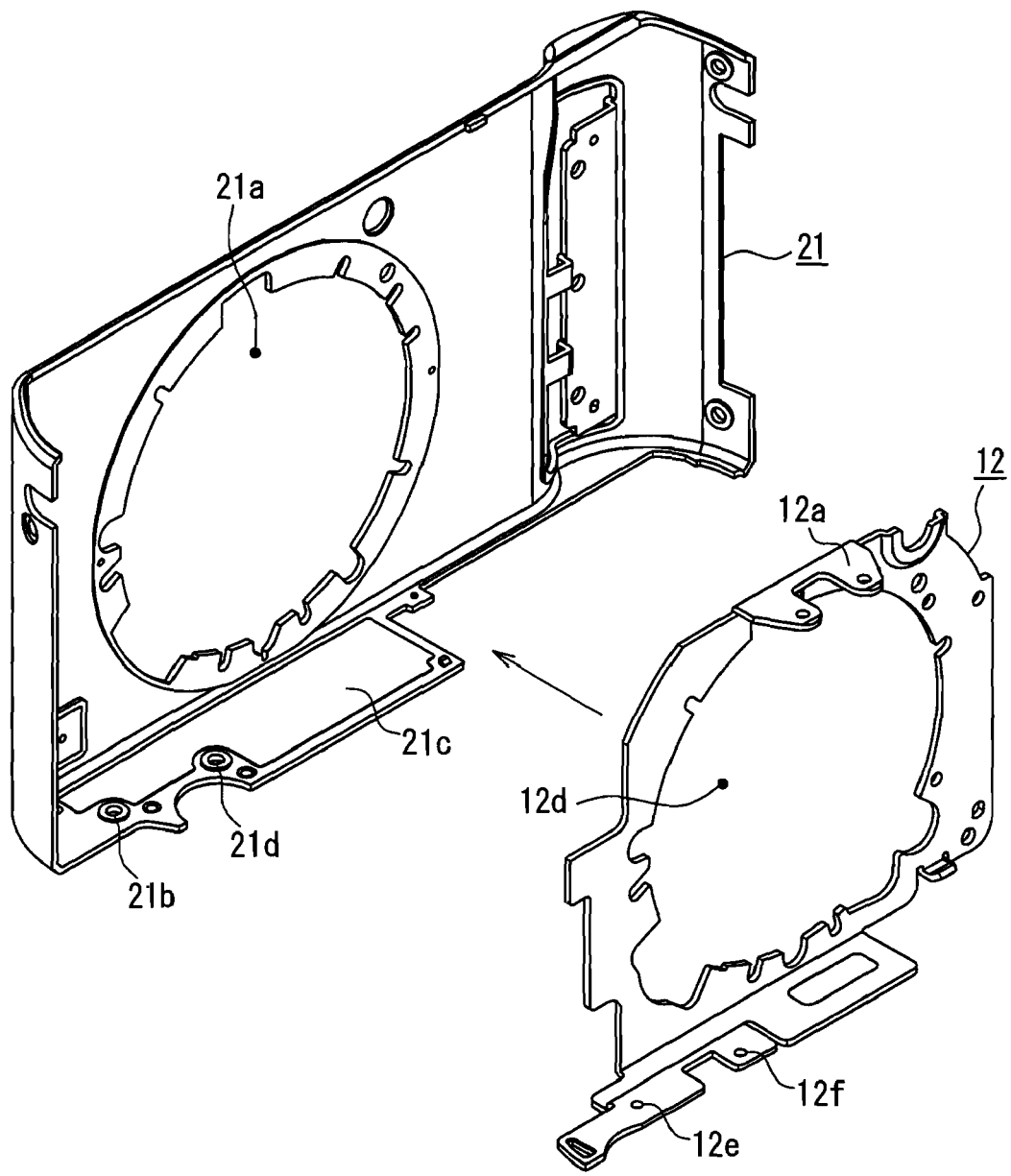
FIG. 7A is a perspective view of the front plate and a front panel.

FIG. 7A is a perspective view of the front plate 12 and the front cover 21. As shown in FIG. 7A, the front plate 12 is attached to the inner surface of the front cover 21. At this time, the front plate 12 is attached to the front cover 21 in such a manner that the opening portion 12d and the opening portion 21a, the screw hole 12e and the hole portion 21b, and the screw hole 12f and the hole portion 21b respectively overlap one another.

Figure 7B:
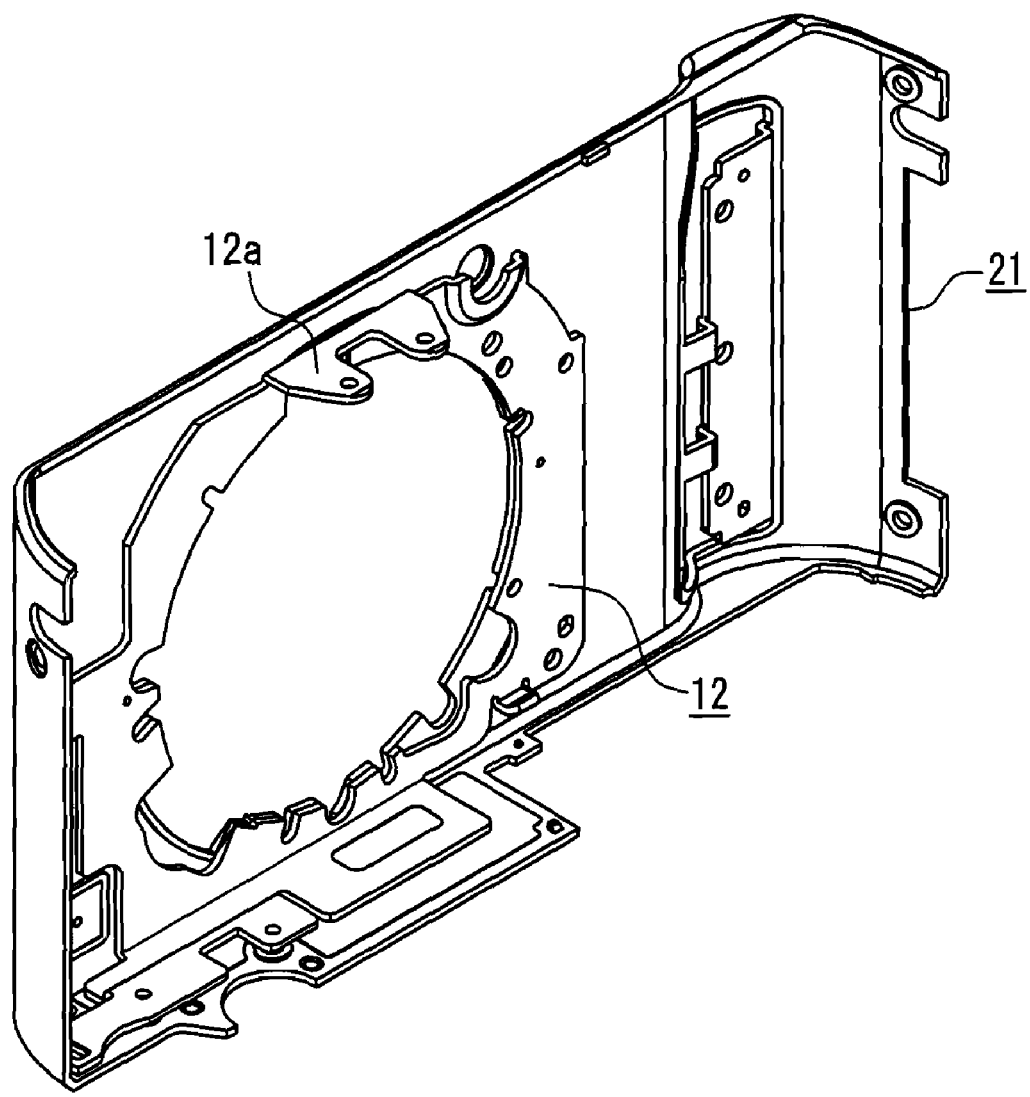
FIG. 7B is a perspective view of the front plate and the front panel.

FIG. 7B shows a state where the front plate 12 is attached to the front cover 21. As shown in FIG. 7B, the rib 12a is positioned in the upper portion of the front cover 21.

Figure 8A:
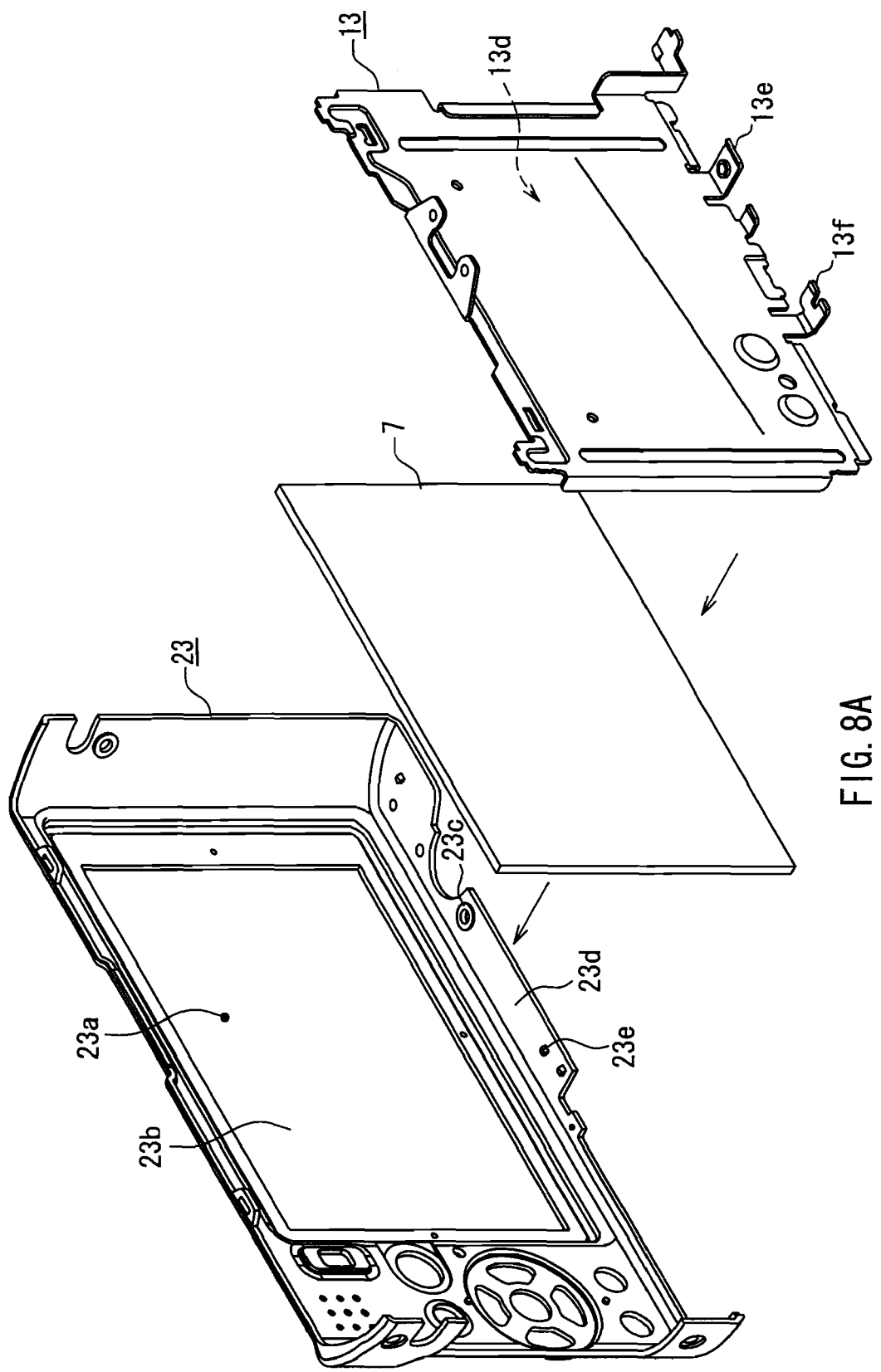
FIG. 8A is a perspective view of the rear plate, a liquid crystal display panel, and a back panel.

FIG. 8A is a perspective view of the liquid crystal display panel 7, the rear plate 13 and the back cover 23. As shown in FIG. 8A, the rear plate 13 is attached to the inner surface of the back cover 23 with the liquid crystal display panel 7 being interposed therebetween. At this time, the liquid crystal display panel 7 is placed such that its display surface faces the inner surface of a transparent plate 23b placed to seal the opening portion 23a. The rear plate 13 is placed such that its plane portion 13d faces the back of the liquid crystal display panel 7.

Figure 8B:
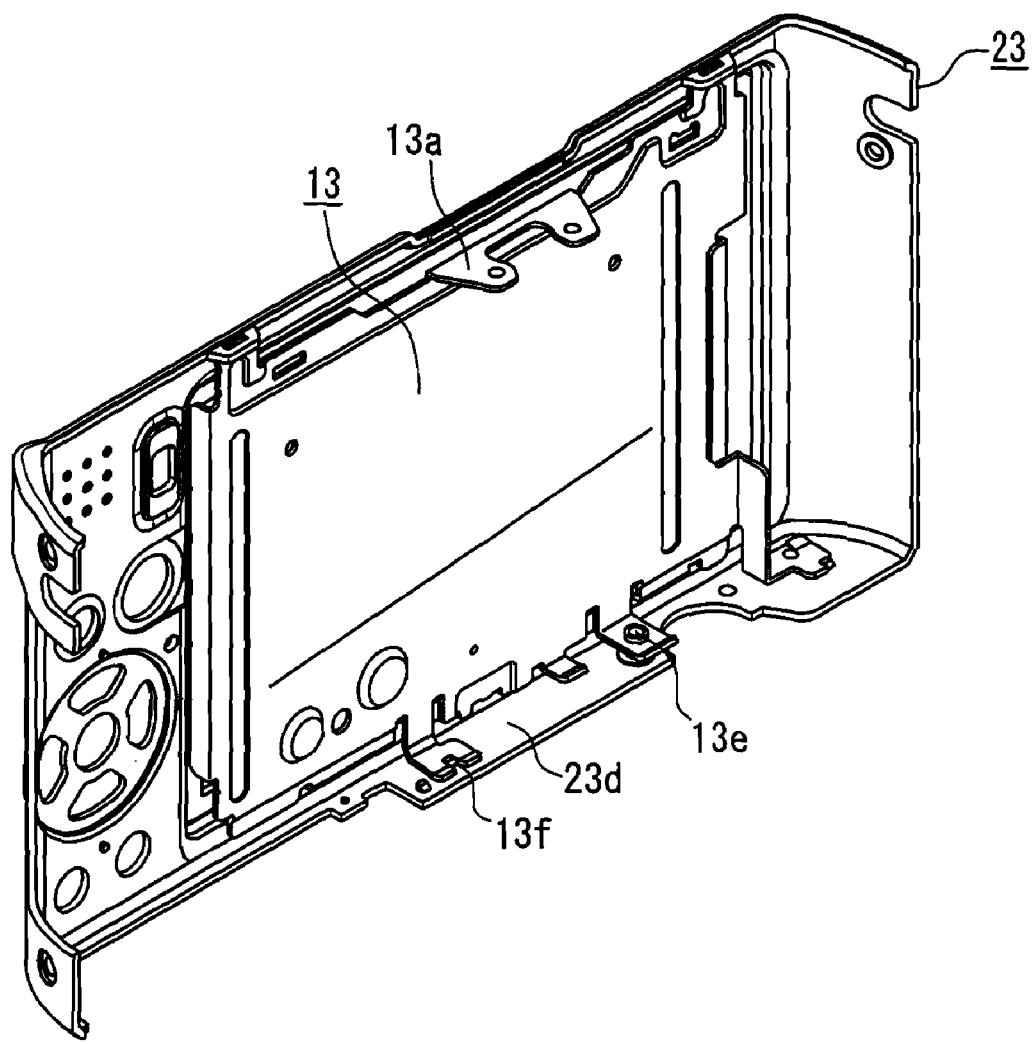
FIG. 8B is a perspective view of the rear plate, the liquid crystal display panel, and the back panel.

FIG. 8B shows a state where the rear plate 13 is attached to the back cover 23. As shown in FIG. 8B, the rib 13a is positioned in the upper portion of the back cover 23. The fixing portion 13e is positioned where it overlaps with the hole portion 23c (see FIG. 8A). The protrusion 23e (see FIG. 8A) is fitted into the recess formed on the fixing portion 13f.

Figure 9A:
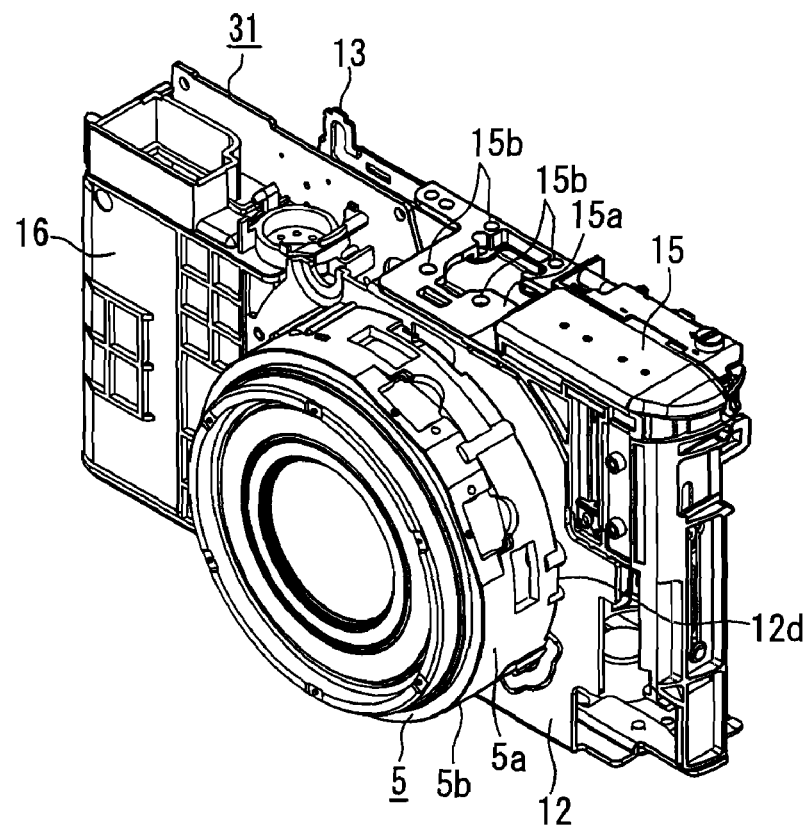
FIG. 9A is a perspective view of the internal structure of the image pickup apparatus according to one embodiment.
Figure 9B:
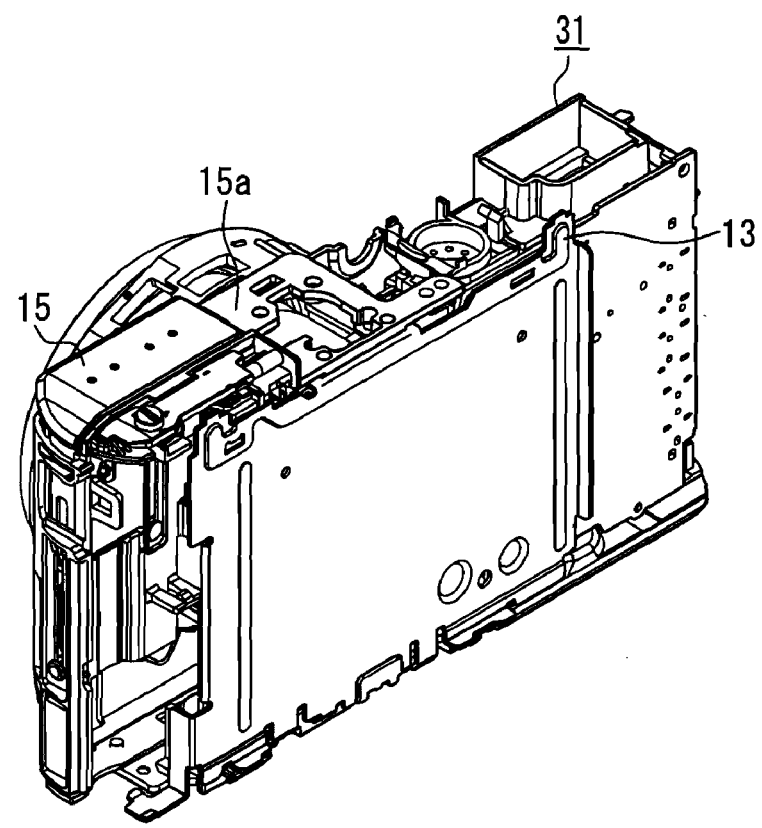
FIG. 9B is a perspective view of the internal structure of the image pickup apparatus according to one embodiment.

FIG. 9A is a perspective view of a main body unit 31 from the front side. FIG. 9B is a perspective view of the main body unit 31 from the backside. As shown in FIGS. 9A and 9B, the main body unit 31 includes the image pickup portion 5, an internal strobe unit 15, a battery storage portion 16, etc. The front cover 21 equipped with the front plate 12 and the back cover 23 equipped with the rear plate 13 and the liquid crystal display panel 7 are attached to the main body unit 31. In FIGS. 9A and 9B, the front cover 21 and the back cover 23 are not shown for the sake of clarity. As shown in FIG. 9A, the lens barrel 5b of the image pickup portion 5 is inserted into the opening portion 12b and the front plate 12 is held by the outer cylindrical surface of the lens barrel 5b. The rear plate 13 is positioned between the liquid crystal display panel 7 and the main body unit 31. The ribs 12a and 13a are positioned under a substrate 15a of the internal strobe unit 15. The hole portions 12b and 12c formed in the rib 12a and the hole portions 13b and 13c formed in the rib 13b each are positioned to overlap with each hole portion 15b formed in the substrate 15a.

Figure 10:
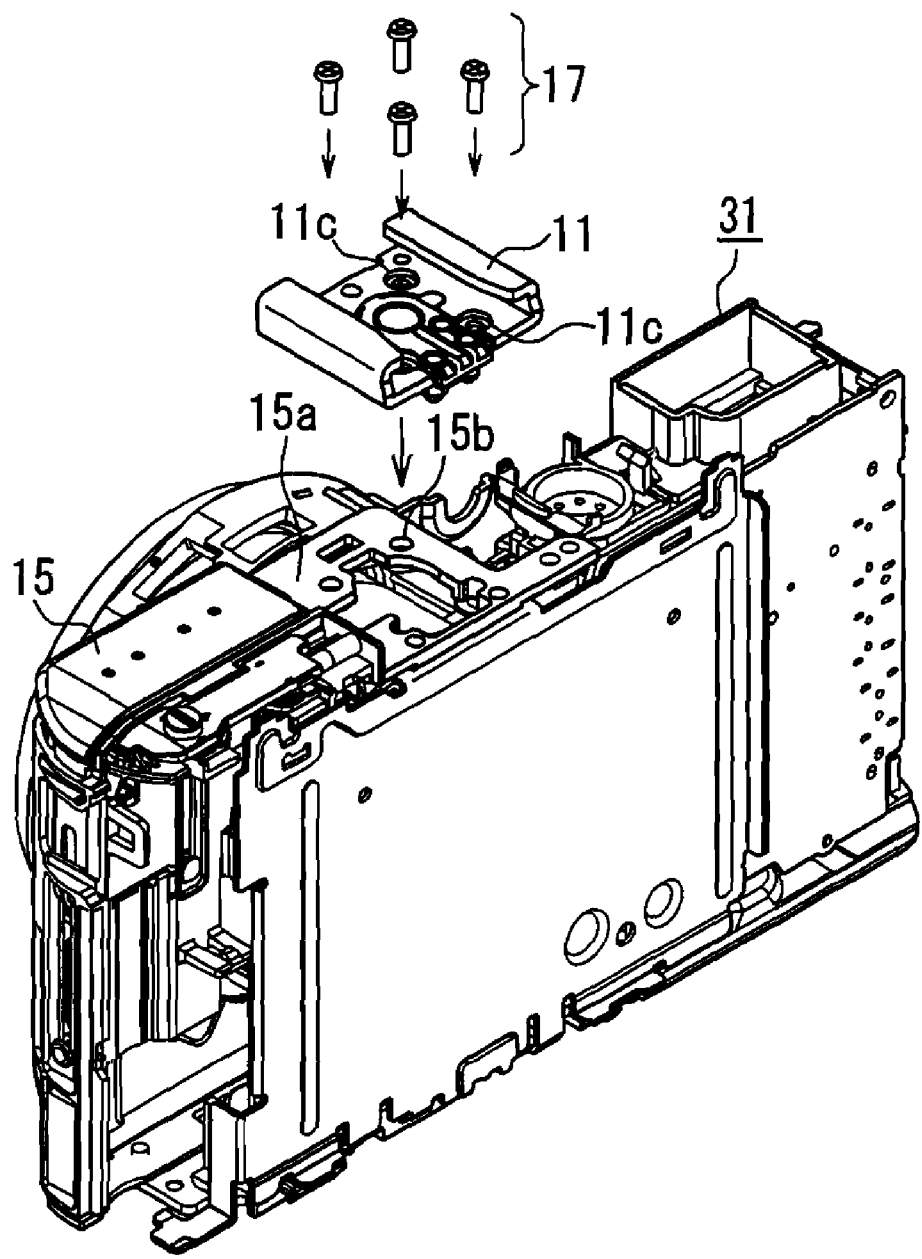
FIG. 10 is a perspective view of the internal structure of the image pickup apparatus according to one embodiment.

FIG. 10 is a perspective view of the accessory shoe 11 and the main body unit 31. Next, as shown in FIG. 10, the accessory shoe 11 is attached to the main body unit 31. That is, the accessory shoe 11 is placed on the top surface of the substrate 15a and is fastened with four screws 17. It should be noted that the number of the screws 17 is an example. The screws 17 pass through hole portions 11c formed in the accessory shoe 11 and the hole portions 15b formed in the substrate 15a, and are respectively screwed into the hole portions 12b and 12c formed in the rib 12a and the hole portions 13b and 13c formed in the rib 13a. Consequently, the accessory shoe 11 is fixed to the front plate 12 and the rear plate 13 through the substrate 15a.

Figure 11A:
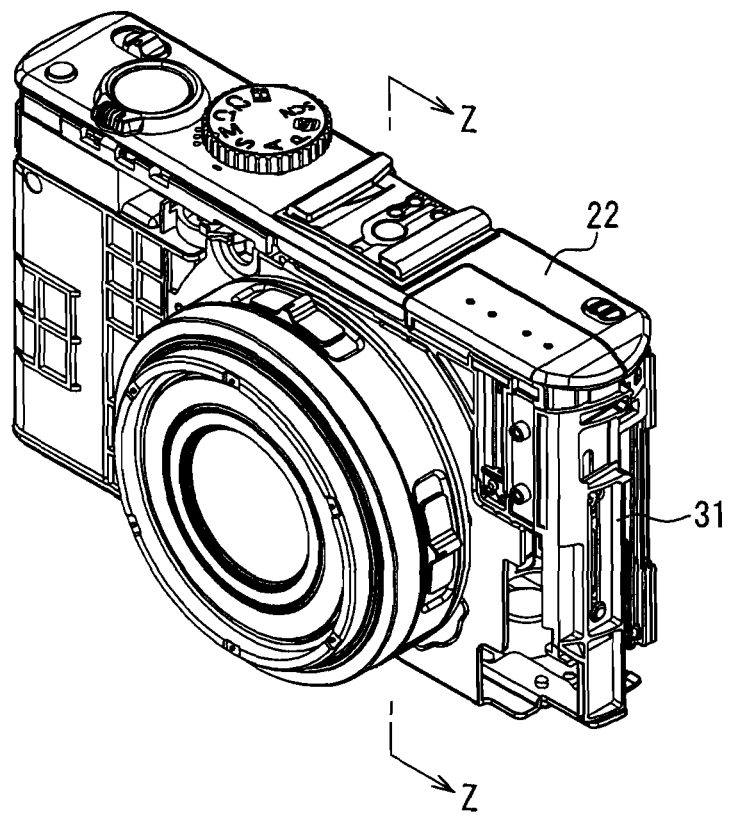
FIG. 11A is a perspective view of the internal structure of the image pickup apparatus according to one embodiment.
Figure 11B:
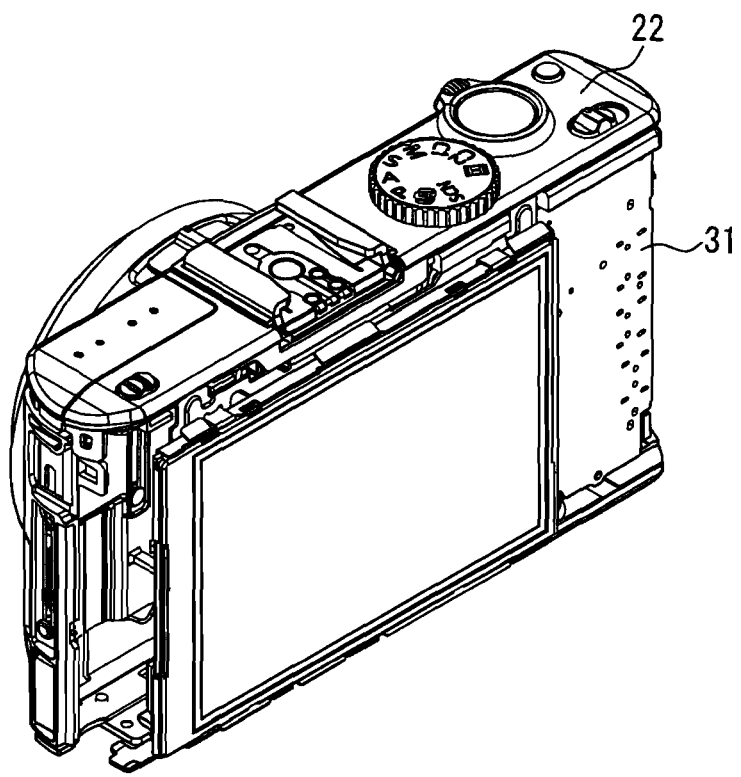
FIG. 11B is a perspective view of the internal structure of the image pickup apparatus according to one embodiment.

FIG. 11A is a perspective view of the main body unit 31 from the front side. FIG. 11B is a perspective view of the main body unit 31 from the backside. As shown in FIGS. 11A and 11B, next, by attaching the top panel 22 to the top of the main body unit 31, the digital camera 1 is completed. In FIGS. 11A and 11B, the front cover 21 and the back cover 23 are not shown for the sake of clarity.

When fixing the front cover 21 to the main body unit 31, a screw (will be described later) is inserted into a hole portions 21b formed in a bottom portion 21c (see FIG. 7A) of the front cover 21 and is screwed into the screw hole 12e formed in the front plate 12. Thereby, the bottom portion of the front plate 12 can be fixed to the main body unit 31. The method of fixing the front plate 12 to the main body unit 31 will be described later.

Further, when fixing the back cover 23 to the main body unit 31, a screw (will be described later) is inserted into the hole portion 23c formed in a bottom portion 23d (see FIG. 8A) of the back cover 23 and the fixing portion 13e formed on the rear plate 13 and is screwed into a given hole portion (not shown) on the main body unit 31. Thereby, the bottom portion of the rear plate 13 can be fixed to the main body unit 31. The method of fixing the rear plate 13 to the main body unit 31 will be described later.

Figure 12:
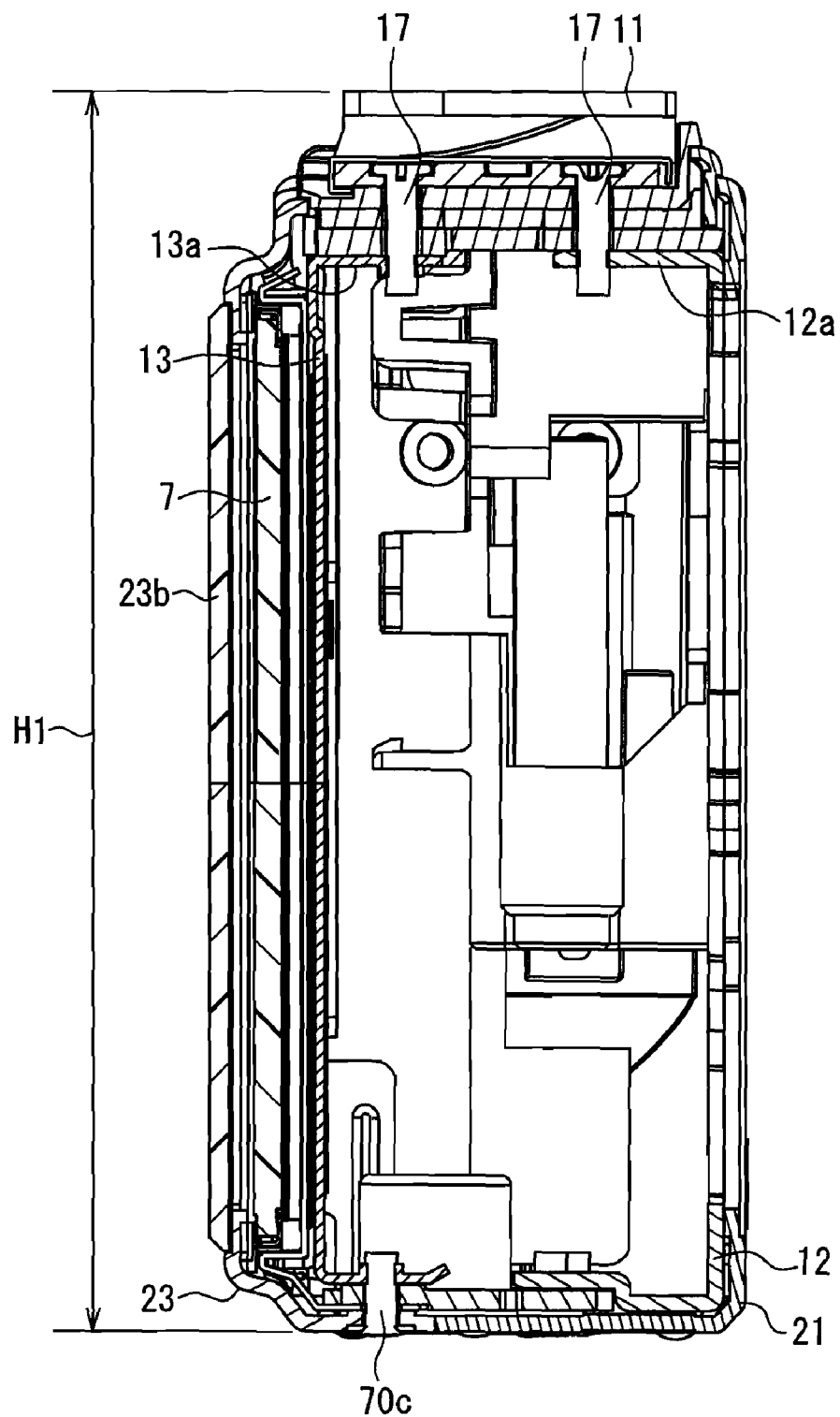
FIG. 12 is a cross-sectional view of the portion Z-Z in FIG. 11A

FIG. 12 is a cross-sectional view of the Z-Z portion in FIG. 11A. As shown in FIG. 12, the screws 17 pass through the hole portions 11c formed in the accessory shoe 11 and respectively are screwed into the screw hole 12b formed in the rib 12a of the front plate 12 and the screw hole 13b formed in the rib 13a of the rear plate 13. The ribs 12a and 13a are positioned on substantially the same plane. That is, since the ribs 12a and 13a are situated on positions that are apart from each other in the thickness direction of the digital camera 1 and do not overlap with each other, a height H1 of the digital camera 1 can be reduced.

[3. Effects of Embodiment, Etc.]

According to the present embodiment, by including the front plate 12 fitted to the outer cylindrical surface of the lens barrel 5b and the rear plate 13 placed on the backside of the liquid crystal display panel 7, and fixing the accessory shoe 11 to the ribs 12a formed on the top of the front plate 12 and to the rib 13a formed on the top of the rear plate 13, it is possible to enhance the strength of attachment of the accessory shoe 11. Therefore, even when an external device with a large weight such as the strobe device 51 is attached to the accessory shoe 11, it is possible to avoid deformation or damage to the accessory shoe 11.

Further, due to the front plate 12 being fitted to the outer cylindrical surface of the lens barrel 5b, it is possible to enhance the strength of attachment of the image pickup portion 5 to the digital camera 1. Thus, even when a lens unit with a large weight such as the conversion lens 31 is attached to the image pickup portion 5 as shown in FIG. 3B, for example, it is possible to avoid damage to the image pickup portion 5.

Also, by placing the rear plate 13 on the backside of the display surface of the liquid crystal display panel 7, it is possible to enhance the bending strength of the liquid crystal display panel 7. Thus, even if a pressure is applied to the display surface of the liquid crystal display panel 7, since it is possible to make the liquid crystal display panel 7 less bendable, cracks in a glass substrate of the liquid crystal display panel 7 can be avoided, for example.

In the present embodiment, the front plate 12 is fitted to the outer cylindrical surface of the lens barrel 5b. However, a portion for holding the front plate 12 is not limited to the lens barrel. For example, the front plate 12 may be held by a side surface of the battery storage portion 16.

Further, in the present embodiment, although the front panel 21, the top panel 22, and the back panel 23 constitute a principal outer casing of the digital camera 1, the present invention may also take other forms. For example, the front panel and the top panel may be formed integrally.

Further, in the present embodiment, the rib 12a is formed on the top of the front plate 12 and the rib 13a is formed on the top of the rear plate 13. However, the rib 12a and the front plate 12 as well as the rib 13a and the rear plate 13 respectively may be formed integrally, or the rib 12a and the rib 13a may be separate parts and they may be fixed respectively to the front plate 12 and the rear plate 13 strongly.

Further, the front plate 12 and the rear plate 13 in the present embodiment can enhance the fixing strength of a tripod fixing part so as to fix the digital camera 1 to a tripod Hereinafter, fixing of the digital camera 1 to a tripod will be described.

Figure 13:
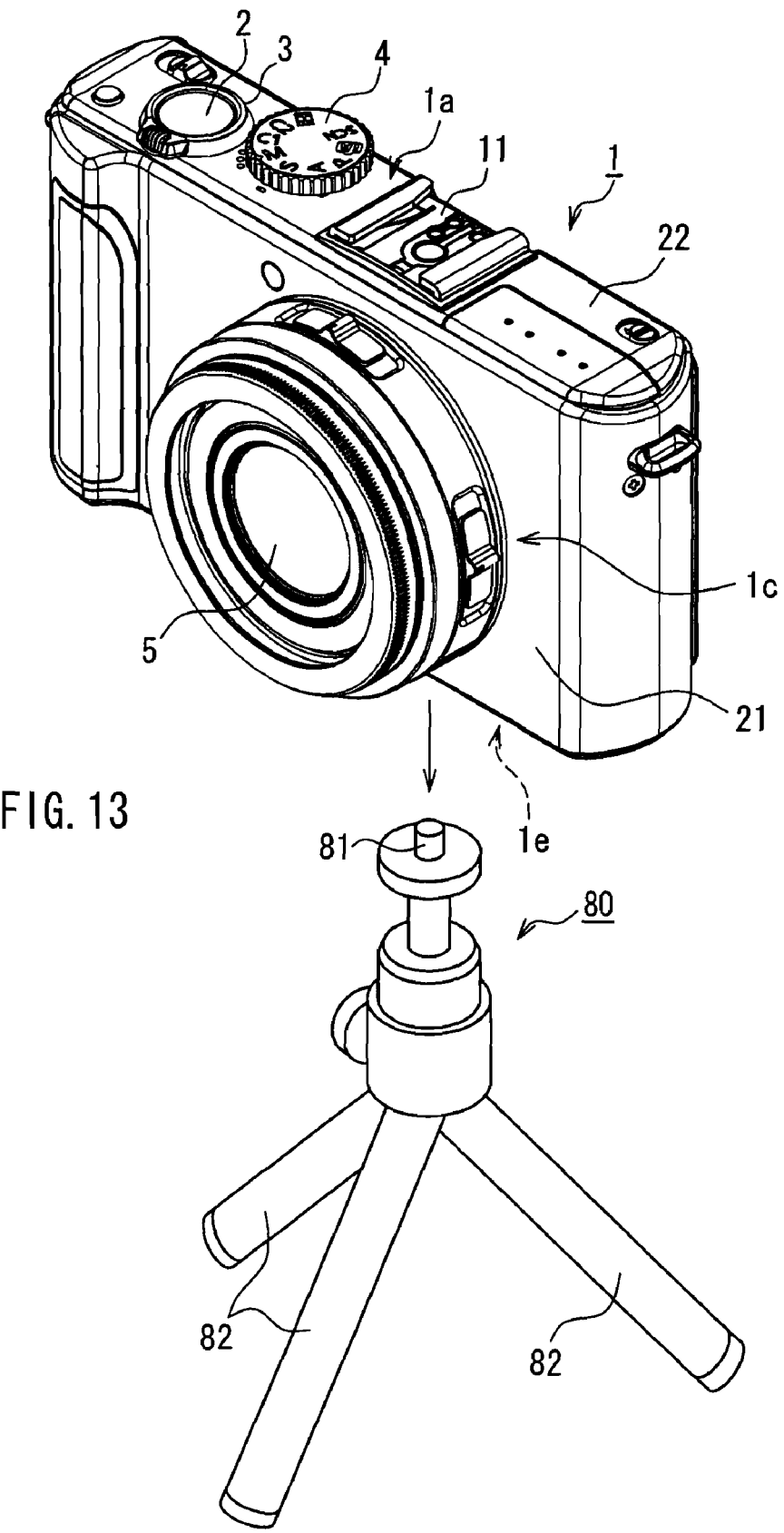
FIG. 13 is a perspective view of the digital camera and a tripod

FIG. 13 is a perspective view of the digital camera 1 and a tripod 80. The tripod 80 includes a screw 81 and three leg portions 82. The screw 81 can be screwed into a female screw (a tripod fixing portion 61 which will be described later) included in the digital camera 1. The leg portions 82 support the tripod 80 in an upright position.

Figure 14:
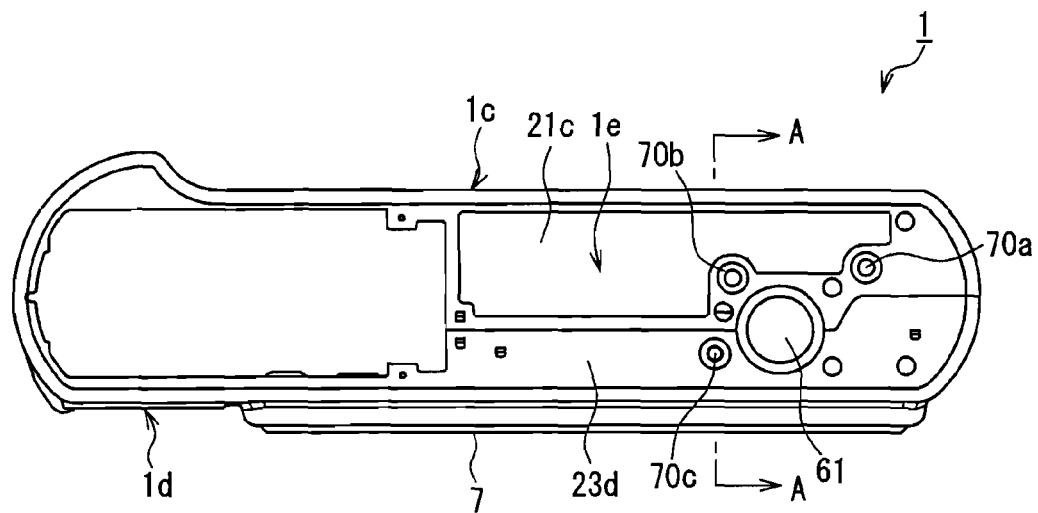
FIG. 14 is a bottom view of a configuration of an under-surface of the digital camera 1.

FIG. 14 is a bottom view of the undersurface 1e of the digital camera 1. As shown in FIG. 14, the undersurface 1e of the digital camera 1 is proved with the tripod fixing portion 61. The tripod fixing portion 61 is a hole portion in a substantially cylindrical shape. A female screw is formed on the inner cylindrical surface of the hole portion. The screw 81 (see FIG. 13) provided on the tripod 80 can be screwed into the tripod fixing portion 61. By screwing the screw 81 provided on the tripod 80 into the tripod fixing portion 61, the digital camera 1 can be fixed to the tripod 80.

Figure 15:
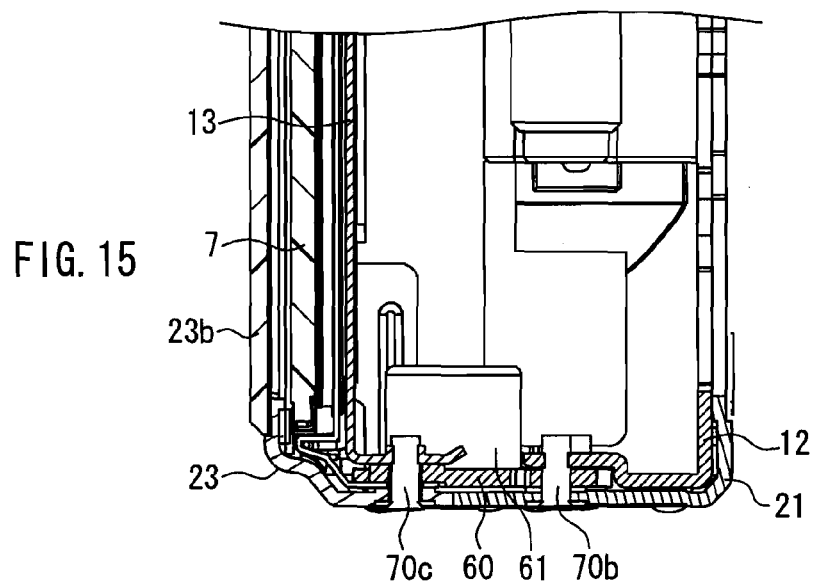
FIG. 15 is a cross-sectional view of principal parts of the portion B-B in FIG. 14.
Figure 16:
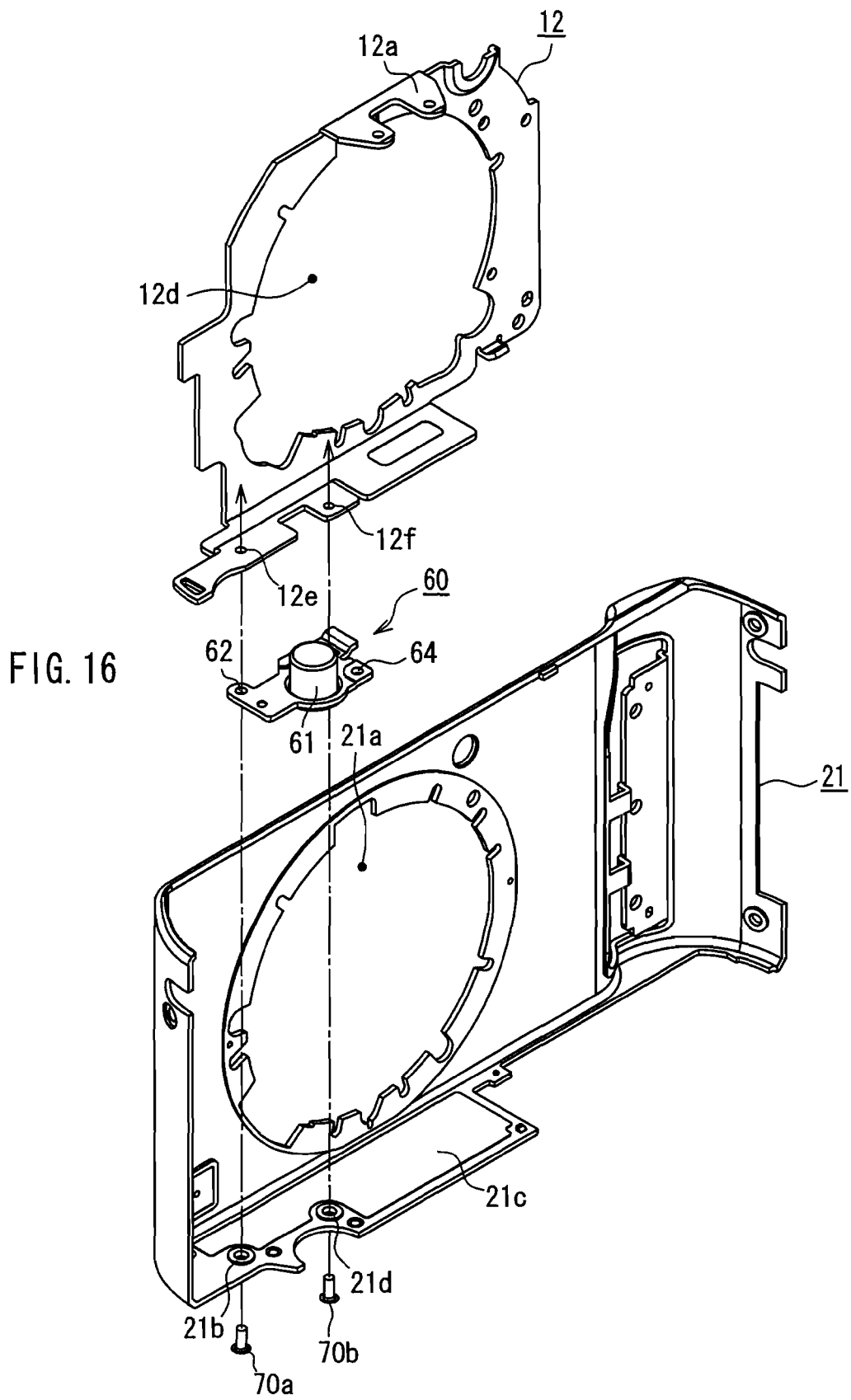
FIG. 16 is a perspective view of the front plate, the front panel, and a tripod fixing part.
Figure 17:
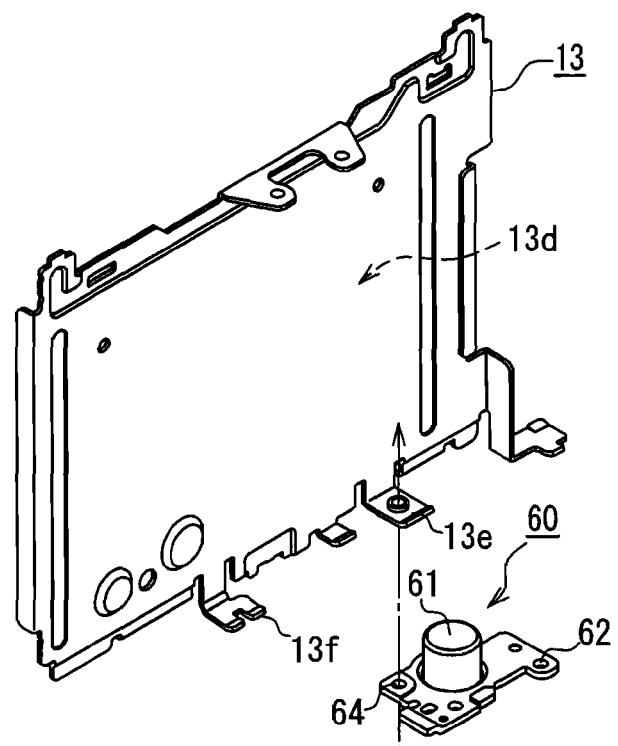
FIG. 17 is a perspective view of the rear plate, the back panel, and the tripod fixing part.
Figure 17:
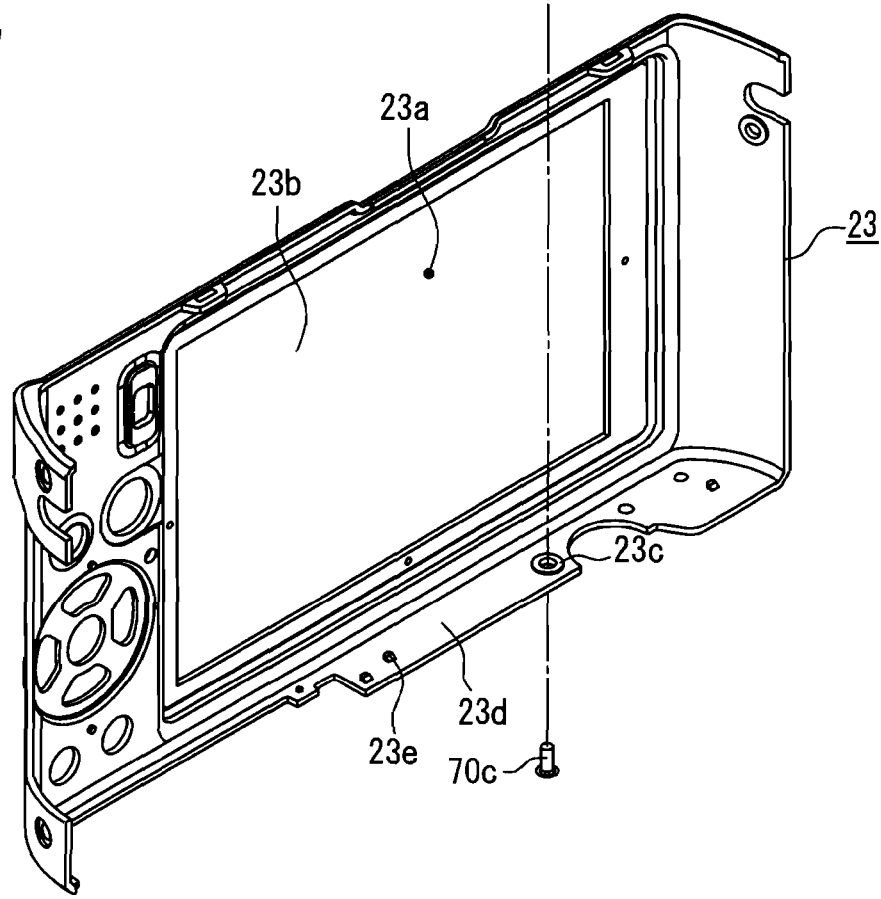

FIG. 15 is a cross-sectional view of the A-A portion in FIG. 14. FIG. 16 is an exploded perspective view of the front plate 12, the front cover 21, and the tripod fixing part 60. FIG. 17 is an exploded perspective view of the rear plate 13, the back cover 23, and the tripod fixing part 60. Although the front side and the backside configurations of the digital camera 1 are shown separately in FIGS. 16 and 17 for the sake of clarity, in reality, one tripod fixing part 60 is fixed to the front side and the rear side of the digital camera 1.

When incorporating the tripod fixing part 60 into the digital camera 1, first, as shown in FIG. 16, a screw 70a is inserted into the hole portion 21b formed in the front cover 21 and a hole portion 62 formed in the tripod fixing part 60, and is screwed into the screw hole 12e formed in the front plate 12. Further, a screw 70b is inserted into the hole portion 21d formed in the front cover 21 and a hole portion 63 (not shown in FIG. 16) formed in the tripod fixing part 60, and is screwed into the screw hole 12f formed in the front plate 12. Next, as shown in FIG. 17, a screw 70c is inserted into the hole portion 23c formed in the back cover 23 and a hole portion 64 formed in the tripod fixing part 60 and is screwed into the screw hole 13e formed in the rear plate 13. Consequently, as shown in FIG. 15, the tripod fixing part 60 is fixed by the screws 70a to 70c while being interposed between the front cover 21 and the front plate 12 and between the back cover 23 and the rear plate 13.

As described above, by fixing the tripod fixing part 60 to the front plate 12 and the rear plate 13, it is possible to enhance the strength of attachment of the tripod fixing part 60. That is, as shown FIG. 2A, etc., when fixing the digital camera 1 equipped with the strove device 51 to the tripod 80 to take pictures, when vibrations or the like is applied to the digital camera 1 or the tripod 80, a load is applied to a portion where the digital camera 1 and the tripod 80 are fixed to each other due to the weight of the digital camera 1 and the strobe device 51. At this time, when the fixing strength of the digital camera 1 to the tripod fixing part 60 is small, the tripod fixing part 60 may be deformed or damaged, or the tripod fixing part 60 may come free from the digital camera 1. In particular, when the tripod fixing part 60 comes free from the digital camera 1, there is a possibility of the digital cameral falling onto the floor or the like, and thereby the digital camera may get damaged due to the impact of the fall. In the present embodiment, by fixing the tripod fixing part 60 to the front plate 12 and the rear plate 13, the fixing strength of the tripod fixing part 60 to the digital camera 1 can be enhanced. Therefore, even if a load is applied to the portion where the digital camera 1 and the tripod 80 are fixed to each other due to vibrations or the like being applied to the digital camera 1 and the tripod 80 in a state where the digital camera 1 is fixed to the tripod 80, it is possible to reduce the chance of the tripod fixing part 60 being deformed or damaged or coming free from the digital camera 1.

Although an example where the digital camera 1 equipped with the strobe device 51 is fixed to the tripod 80 has been described in the above, it is also possible to reduce the chance of the tripod fixing part 60 being deformed or damaged or coming free from the digital camera 1 even when the digital camera 1 equipped with a lens unit with a large weight such as the conversion lens 31 is fixed to tripod 80, as shown in FIG. 3B.

Further, the front panel 21, the top panel 22, and the back panel 23 in the present embodiment are one example of the casing of the present invention. The front plate 12 in the present embodiment is one example of the first support member of the present invention. The rear plate 13 in the present embodiment is one example of the second support member of the present invention. The ribs 12a and 13a in the present embodiment are one example of the fixing portions of the present invention.

The image pickup apparatus of the present invention is of great value as a device including an accessory shoe.

With respect to the above embodiment, the following appendixes will be disclosed.

[Appendix 1]

The image pickup apparatus of the present invention is an image pickup apparatus that includes: a casing; and an accessory shoe placed on a top surface of the casing and to which a variety of external devices can be attached. The image pickup apparatus further includes a first support member fixed to a first side surface adjacent to the top surface of the casing, and a second support member fixed to a second side surface facing the first side surface. The first support member and the second support member each includes a fixing portion for fixing the accessory shoe.

[Appendix 2]

The image pickup apparatus of the present invention further may include a barrel including a lens and being placed on the first side surface, and the first support member may be fitted to an outer cylindrical surface of the barrel.

By configuring the image pickup apparatus of the present invention in this way, it is possible to enhance not only the strength of attachment of the accessory shoe but also that of the barrel.

[Appendix 3]

The image pickup apparatus of the present invention further may include a display panel capable of displaying images and being placed on the second side surface, and the second support member may be placed on a backside of a display surface of the display panel.

By configuring the image pickup apparatus of the present invention in this way, it is possible not only to enhance the strength of attachment of the accessory shoe but also to avoid the occurrence of a crack in the display panel when pressure is applied to the display surface.

[Appendix 4]

In the image pickup apparatus of the present invention, the fixing portions may include a first fixing portion provided on the first support member and a second fixing portion provided on the second support member, and the first fixing portion and the second fixing portion may be aligned in a surface direction of the top surface of the casing.

By configuring the image pickup apparatus of the present invention in tis way, it is possible to reduce the size of the casing in the height direction (the direction orthogonal to the top surface of the casing), thereby enabling to reduce the size of the image pickup apparatus.

[Appendix 5]

The image pickup apparatus of the present invention further may include a tripod fixing part to which a tripod can be fixed, and the tripod fixing part may be fixed to the first support member and the second support member.

By configuring the image pickup apparatus of the present invention in this way, it is possible to enhance the strength of attachment of the tripod fixing part. Therefore, even if a load is applied to the tripod fixing part due to vibrations or the like being applied to the image pickup apparatus or the like in a state where the image pickup apparatus is fixed to a tripod, it is possible to avoid deformation or damage to the tripod fixing part. In particular, this configuration is effective in avoiding deformation or damage to the tripod fixing part when the image pickup apparatus is fixed to a tripod in a state where a device with a large weight such as a strobe device is attached to the accessory shoe.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An image pickup apparatus, comprising:
a casing including a top panel on which an accessory shoe is placed, a front panel, and a rear panel;
a first support member disposed inside the casing, having a first main plane that is directly attached to an inner surface of the front panel, and
a second support member disposed inside the casing, having a second main plane that is directly attached to an inner surface of the rear panel,
the first support member includes a first rib that extends orthogonally to the first main plane, and
the second support member includes a second rib that extends orthogonally to the second main plane,
the first rib and the second rib are connected to the accessory shoe.

2. The image pickup apparatus according to claim 1, further comprising a barrel including a lens and being placed on the first main plane,
wherein the first support member is fitted to an outer cylindrical surface of the barrel.

3. The image pickup apparatus according to claim 1, further comprising a display panel capable of displaying images, the display panel disposed on the second main plane, interposed between the inner surface of the rear panel and the second support member,
wherein a portion of the second main plane of the second support member faces the display panel.

4. The image pickup apparatus according to claim 1,
wherein the first rib includes a first fixing portion, the second rib includes a second fixing portion, and
the first fixing portion and the second fixing portion are aligned in a surface direction of the top panel of the casing.

5. The image pickup apparatus according to claim 1, further comprising a tripod fixing part to which a tripod can be fixed,
wherein the tripod fixing part is fixed to the first support member and the second support member.

6. An image pickup apparatus for allowing the attachment of various external devices, comprising:
a casing including a top panel, a bottom panel, a front panel, and a rear panel;
a first support member disposed inside the casing, and directly attached to the front panel of the casing;
a second support member disposed inside the casing, and directly attached to the rear panel of the casing; and
the first support member including a first rib for fixing an attachment part to the first support member,
the second support member including a second rib for fixing the attachment part to the second support member, and
one or more attachment part(s), each being disposed at one or more of (i) the top panel of the casing and (ii) the bottom panel of the casing, wherein the attachment part(s) operably attaches various external devices to the image pickup apparatus.

7. The image pickup apparatus according to claim 6, further comprising a barrel including a lens and being provided on the front panel,
wherein the first support member is fitted to an outer cylindrical surface of the barrel.

8. The image pickup apparatus according to claim 6, further comprising a display panel capable of displaying images and being provided on the rear panel by being interposed between an inner surface of the rear panel and the second support member,
wherein a plane portion of the second support member faces the display panel.

9. The image pickup apparatus according to claim 6,
wherein the first fixing rib and the second fixing rib are aligned on substantially the same plane which is a surface direction of the top panel of the casing.

10. The image pickup apparatus of claim 6, wherein the attachment part is at the top panel,
the first support member and second support member each includes additional fixing portion for fixing a second attachment part at the bottom panel, and
the external devices include a strobe device and a tripod, wherein the strobe device is attached to the attachment part at the top panel, and the tripod is attached to the second attachment part at the bottom panel.

* * * * *